United States Patent
McBeath et al.

(10) Patent No.: US 8,265,029 B2
(45) Date of Patent: Sep. 11, 2012

(54) METHOD AND APPARATUS FOR ASSIGNING RESOURCES IN A WIRELESS SYSTEM

(75) Inventors: Sean Michael McBeath, Keller, TX (US); Anthony C. K. Soong, Plano, TX (US); Yunsong Yang, San Diego, CA (US); Jianmin Lu, San Diego, CA (US); Jung Woon Lee, Allen, TX (US)

(73) Assignee: FutureWei Technologies, Inc., Plano, TX (US)

( * ) Notice: Subject to any disclaimer, the term of this patent is extended or adjusted under 35 U.S.C. 154(b) by 970 days.

(21) Appl. No.: 12/135,599

(22) Filed: Jun. 9, 2008

(65) Prior Publication Data

US 2008/0310362 A1 Dec. 18, 2008

Related U.S. Application Data

(60) Provisional application No. 60/944,469, filed on Jun. 15, 2007, provisional application No. 60/944,462, filed on Jun. 15, 2007, provisional application No. 60/944,466, filed on Jun. 15, 2007, provisional application No. 60/944,477, filed on Jun. 15, 2007.

(51) Int. Cl.
*H04W 4/00* (2009.01)
(52) U.S. Cl. ........................................ 370/330; 370/329
(58) Field of Classification Search .................. 370/330
See application file for complete search history.

(56) References Cited

U.S. PATENT DOCUMENTS

| | | | |
|---|---|---|---|
| 6,377,572 B1 | 4/2002 | Dolan et al. | |
| 6,404,325 B1 | 6/2002 | Heinrich et al. | |
| 6,597,919 B1 | 7/2003 | Kumar et al. | |
| 6,907,246 B2 | 6/2005 | Xu et al. | |
| 7,116,240 B2 | 10/2006 | Hyde | |
| 7,215,251 B2 | 5/2007 | Hyde | |
| 7,706,323 B2 | 4/2010 | Stopler et al. | |
| 2003/0221012 A1 | 11/2003 | Herrmann et al. | |

(Continued)

FOREIGN PATENT DOCUMENTS

CN 1536794 A 10/2004

(Continued)

OTHER PUBLICATIONS

McBeath, S., et al., "Efficient Signaling for VoIP in OFDMA," 2007 Wireless Communications and Networking Conference, Mar. 11-15, 2007, 6 pages, IEEE.

(Continued)

*Primary Examiner* — Ian N Moore
*Assistant Examiner* — Afshawn Towfighi
(74) *Attorney, Agent, or Firm* — Slater & Matsil, L.L.P.

(57) ABSTRACT

A method and apparatus of signaling radio resource allocation in a wireless communication system includes the time-frequency resources into multiple regions; defining a channel tree within at least one region, wherein the channel tree has base nodes which are determined using the area of the region and the area of a base node; determining a channel identifier assignment for a mobile station, wherein the channel identifier corresponds to a collection of base nodes from a channel tree; transmitting an indication of the determined channel identifier to the mobile station; and transmitting a packet to a mobile station or receiving a packet from the mobile station using the physical time-frequency resources, which correspond to the channel identifier.

18 Claims, 25 Drawing Sheets

U.S. PATENT DOCUMENTS

| | | | |
|---|---|---|---|
| 2004/0145454 A1 | 7/2004 | Powell et al. | |
| 2005/0201269 A1 | 9/2005 | Shim et al. | |
| 2005/0281228 A1 | 12/2005 | Oh et al. | |
| 2006/0039274 A1 | 2/2006 | Park et al. | |
| 2006/0133312 A1 | 6/2006 | Teague et al. | |
| 2006/0209754 A1* | 9/2006 | Ji et al. ................... | 370/329 |
| 2006/0293076 A1 | 12/2006 | Julian et al. | |
| 2007/0058523 A1 | 3/2007 | Cho et al. | |
| 2007/0060178 A1 | 3/2007 | Gorokhov et al. | |
| 2007/0076670 A1 | 4/2007 | Kuchibhotla et al. | |
| 2007/0097910 A1 | 5/2007 | Ji et al. | |
| 2007/0206561 A1 | 9/2007 | Son et al. | |
| 2007/0217370 A1 | 9/2007 | Soong et al. | |
| 2007/0230412 A1 | 10/2007 | McBeath et al. | |
| 2007/0274288 A1 | 11/2007 | Smith et al. | |
| 2007/0286066 A1 | 12/2007 | Zhang et al. | |
| 2007/0291708 A1 | 12/2007 | Rao | |
| 2008/0004029 A1 | 1/2008 | Moilanen | |
| 2008/0025247 A1 | 1/2008 | McBeath et al. | |
| 2008/0025337 A1 | 1/2008 | Smith et al. | |
| 2008/0034274 A1 | 2/2008 | Song et al. | |
| 2008/0037496 A1 | 2/2008 | Smith et al. | |
| 2008/0043615 A1 | 2/2008 | Li et al. | |
| 2008/0062936 A1 | 3/2008 | He et al. | |
| 2008/0062944 A1 | 3/2008 | Smith et al. | |
| 2008/0084843 A1 | 4/2008 | Gorokhov et al. | |
| 2008/0146241 A1 | 6/2008 | Das et al. | |
| 2008/0192847 A1 | 8/2008 | Classon et al. | |
| 2008/0240034 A1 | 10/2008 | Gollamudi | |
| 2009/0022098 A1 | 1/2009 | Novak et al. | |
| 2009/0029710 A1 | 1/2009 | Ochiai et al. | |
| 2009/0047912 A1 | 2/2009 | Lee et al. | |
| 2009/0075667 A1 | 3/2009 | Bourlas | |

FOREIGN PATENT DOCUMENTS

| | | | |
|---|---|---|---|
| CN | 1968452 A | 5/2007 | |
| CN | 101102142 A | 1/2008 | |
| CN | 1780188 A | 5/2008 | |
| EP | 1 786 220 A1 | 5/2007 | |
| WO | WO 2006/001658 A1 | 1/2006 | |
| WO | WO 2006/096887 A1 | 9/2006 | |
| WO | WO 2006/099577 A1 | 9/2006 | |
| WO | WO 2006/113873 A2 | 10/2006 | |
| WO | WO 2006/137708 A1 | 12/2006 | |

OTHER PUBLICATIONS

McBeath, S., et al., "Efficient Bitmap Signaling fo VoIP in OFDMA," 2007 Vehicular Technology Conference, Sep. 30, 2007-Oct. 3, 2007, 5 pages, IEEE.

Bourlas, Y., et al., "Persistent Allocation Updated Procedures," IEEE 802.16 Broadband Wireless Access Working Group, IEEE P802.16Rev2/D4, Apr. 19, 2008, pp. 1-50, IEEE.

"Medium Access Control Layer for Ultra Mobile Broadband (UMB) Air Interface Specification," 3$^{rd}$ Generation Partnership Project 2, 3GPP2 C.S0084-0020-0, Version 2.0, Aug. 2007, 157 pages, 3GPP2.

Written Opinion of the International Searching Authority, App. No. PCT/CN2008/071325, Date of mailing: Sep. 18, 2008, 5 pages.

Written Opinion of the International Searching Authority, App. No. PCT/CN2008/071317, Date of mailing: Sep. 18, 2008, 4 pages.

First Chinese Office Action, Chinese Application No. 200880001172.3, Dated: Jul. 1, 2010, 6 pages.

Second Chinese Office Action, Chinese Application No. 200880001172.3, Dated: Feb. 28, 2011, 9 pages.

"Text Proposal for Downlink OFDMA Resource Allocation and Mapping Rules for Distributed Mode Users in E-UTRA, with Discussion on Control Information," 3GPP TSG RAN WG1 #45, R1-061149, May 8-12, 2006, pp. 1-8.

U.S. Appl. No. 60/888,833, Classon et al., filed Feb. 8, 2007, the specification and drawings.

"Technical Specification Group Radio Access Network; Physical Layer Aspects for Evolved UTRA (Release7)," 3$^{rd}$ Generation Project, 3GPP TR 25.814, V1.3.1, May 2006, pp. 6-11.

Third Chinese Office Action, Chinese Application No. 200880001172.3, Jun. 15, 2011, 9 pages.

First Chinese Office Action, Chinese Application No. 200880001601.7, mailed date: Apr. 25, 2012, 11 pages. (Partial Translation)

"Part 16: Air Interface for Fixed Broadband Wireless Access Systems," Draft IEEE Standard for Local and metropolitan area networks, IEEE P802, 16-REVd.D5-2004, May 2004, pp. 7-12.

* cited by examiner

| | | | | | | |
|---|---|---|---|---|---|---|
| 15 | 16 | 17 | | | | |
| 18 | 19 | 20 | | | | |
| 21 | 22 | 23 | | | | |
| 24 | 25 | 26 | | | | |
| 27 | 28 | 29 | | | | |
| | 30 | | | | | |

DL PUSC Subcarrier Permutation (6 OFDM Symbols)

Imaginary Base Nodes 1455

FIGURE 14B

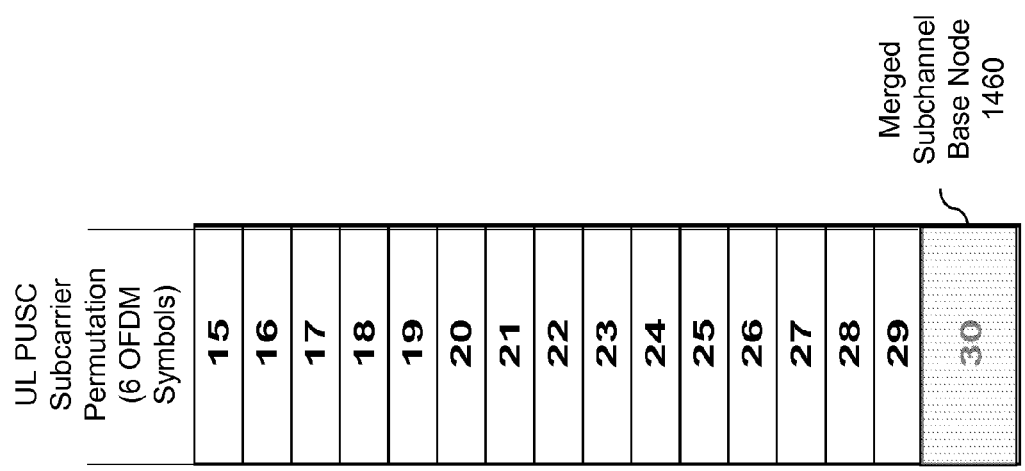

METHOD AND APPARATUS FOR ASSIGNING RESOURCES IN A WIRELESS SYSTEM

This application claims priority to U.S. Provisional Patent Application No. 60/944,469 filed Jun. 15, 2007, entitled "Method and Apparatus For Assigning Resources In A Wireless System" which application is hereby incorporated herein by reference.

CROSS REFERENCE TO RELATED APPLICATIONS

This application is related to the following provisional U.S. patent applications, each of which is incorporated herein by reference: U.S. Provisional Patent Application No. 60/944,462 filed Jun. 15, 2007; U.S. Provisional Patent Application No. 60/944,466 filed Jun. 15, 2007; and U.S. Provisional Patent Application No. 60/944,477 filed Jun. 15, 2007. Further, this application is related to the following non-provisional patent applications, each of which is incorporated herein by reference: U.S. patent application Ser. No. 12/134,025, filed Jun. 5, 2008; U.S. patent application Ser. No. 12/135,930, filed Jun. 9, 2008; and U.S. patent application Ser. No. 12/135,916, filed Jun. 9, 2008.

FIELD OF THE INVENTION

The present invention generally relates to allocation of radio resources for transmission in a wireless communication system. Specifically, the present invention relates to a novel method of signaling the allocation of radio resources for transmission in, e.g., orthogonal frequency division multiplexing (OFDM) and orthogonal frequency division multiple access (OFDMA) communication systems and the resulting systems.

BACKGROUND OF THE INVENTION

In an OFDMA communication system, the time-frequency resources of the system are shared among a plurality of mobile stations. A base station assigns resources to mobile stations using an assignment message, which is transmitted as part of a control channel. To minimize control channel overhead, it is known for the base station to utilize a channel tree, wherein the channel tree is comprised of nodes, wherein each channel tree node corresponds to a specific portion of the time-frequency resources of the system.

In some OFDMA communication systems, the time-frequency resources are divided into multiple regions (also called zones) to facilitate different types of transmissions. For example, for time division duplex (TDD) systems, the time domain is divided into a downlink (DL) region and an uplink (UL) region. In some systems, the DL region and UL region are further divided into additional regions. For example, the DL may be divided into a partial usage of subcarriers (PUSC) region and a full usage of subcarriers (FUSC) region such as described by the IEEE 802.16 standard. Mobile stations assigned to the DL PUSC region experience less interference than mobile stations assigned to the DL FUSC region. Therefore, the DL PUSC region is often advantageous for mobile stations near the cell edge. The DL FUSC region utilizes the entire bandwidth in each sector, thereby maximizing the spectral efficiency. The DL FUSC region is advantageous for those mobile stations that can tolerate increased interference relative to what would be seen in the DL PUSC region and is therefore advantageous for mobile stations near the base station.

Within each region, subchannels are defined, wherein each subchannel is a subset of the entire frequency resources. The subchannel definition may be different for the different regions. In addition, the minimum time-frequency assignment in each region may be different.

It is known to define a channel tree when there is only one region. However, it is not known how to create a channel tree for systems that allow multiple regions with dynamic boundaries. Thus, there is a need for creating a channel tree, for the case when there are multiple dynamic regions, for efficiently allocating time-frequency resources.

SUMMARY OF THE INVENTION

In one aspect, the present invention provides for a method of assigning a radio resource in a wireless communication system. The method includes transmitting at least one region boundary to a mobile station, the at least one region boundary indicating a division of time-frequency resources into at least two regions. The method further includes determining a channel identifier assignment for the mobile station, the channel identifier corresponding to a collection of base nodes from a channel tree, the channel tree having base nodes that are determined based on the area of a first region of the at least two regions and the area of a nominal base node, and transmitting an indication of the determined channel identifier to the mobile station.

In another aspect, the present invention provides for a method of receiving a radio resource assignment in a wireless communication system. The method includes receiving at least one region boundary from a base station, the at least one region boundary indicating a division of the time-frequency resources into at least two regions. The method further includes receiving an indication of a channel identifier from the base station, the channel identifier corresponding to a collection of base nodes from a channel tree, the channel tree having base nodes which are determined based on the area of a first region of the at least two regions and the area of a nominal base node.

In yet another aspect, the present invention provides for a method of dynamically assigning time-frequency resources for a pre-defined region of available time-frequency resources. Steps of the method include (a) determining an area of the pre-defined region, the area being a multiple of a number of OFDM symbols in the pre-defined region and a number of OFDM sub-channels in the pre-defined region, (b) determining a number of nominal base nodes of pre-defined area that will fill the area of the pre-defined region, (c) determining a number of imaginary base nodes, the number of imaginary base nodes being the difference between the number of nominal base nodes determined in step (b) and the next highest power of a pre-selected integer, (d) determining an area of a non-nominal base node when the area of the pre-defined region divided by the area of a nominal base node is not an integer, and (e) logically apportioning the time-frequency resources of the pre-defined region into the nominal base nodes determined in step (c), the imaginary base nodes determined in step (c), and the non-nominal base node determined in step (d).

In yet another aspect, the present invention provides for a base station comprising a processor and a computer readable medium storing programming for execution by the processor. The programming includes instructions to: transmit at least one region boundary to a mobile station, the at least one region boundary indicating a division of time-frequency resources into at least two regions, and to determine a channel identifier assignment for the mobile station, the channel identifier corresponding to a collection of base nodes from a channel tree, the channel tree having base nodes that are determined based on the area of a first region of the at least two regions and the area of a nominal base node. The programming includes further instructions to transmit an indication of the determined channel identifier to the mobile station.

BRIEF DESCRIPTION OF THE DRAWINGS

FIG. 14B illustrates an additional example of imaginary base nodes.

FIG. 14C illustrates the concept of a merged subchannel base node.

DETAILED DESCRIPTION OF ILLUSTRATIVE EMBODIMENTS

The present disclosure can be described by the embodiments given below. It is understood, however, that the embodiments below are not necessarily limitations to the present disclosure, but are used to describe a typical implementation of the invention.

The present invention provides a unique method and apparatus for assigning resources in a wireless system. It is understood, however, that the following disclosure provides many different embodiments, or examples, for implementing different features of the invention. Specific examples of components, signals, messages, protocols, and arrangements are described below to simplify the present disclosure. These are, of course, merely examples and are not intended to limit the invention from that described in the claims. Well known elements are presented without detailed description in order not to obscure the present invention in unnecessary detail. For the most part, details unnecessary to obtain a complete understanding of the present invention have been omitted inasmuch as such details are within the skills of persons of ordinary skill in the relevant art. Details regarding control circuitry described herein are omitted, as such control circuits are within the skills of persons of ordinary skill in the relevant art.

Figure 1:
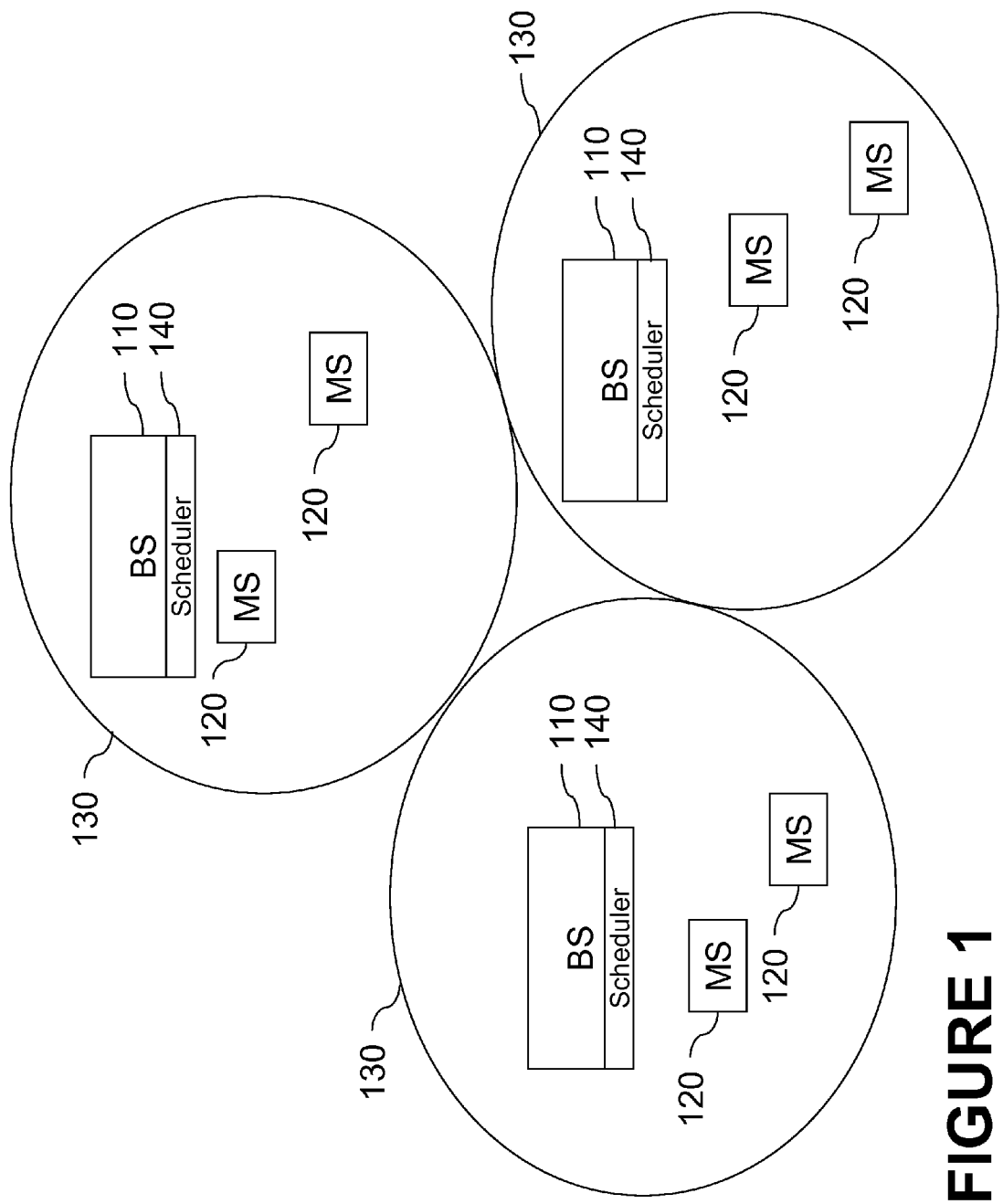
FIG. 1 illustrates a wireless communications network.

FIG. 1 is a wireless communications network comprising a plurality of base stations (BS) 110 providing voice and/or data wireless communication service to respective pluralities of mobile stations (MS) 120. A BS is also sometimes referred to by other names such as access network (AN), access point (AP), Node-B, etc. Each BS has a corresponding coverage area 130. Referring to FIG. 1, each base station includes a scheduler 140 for allocating radio resources to the mobile stations. Exemplary wireless communication systems include, but are not limited to, Evolved Universal Terrestrial Radio Access (E-UTRA) networks, Ultra Mobile Broadband (UMB) networks, IEEE 802.16 networks, and other OFDMA based networks. In some embodiments, the network is based on a multiple access scheme other than OFDMA. For example, the network can be a frequency division multiplex access (FDMA) network wherein the time-frequency resources are divided into frequency intervals over a certain time interval, a time division multiplex access (TDMA) network wherein the time-frequency resources are divided into time intervals over a certain frequency interval, and a code division multiplex access (CDMA) network wherein the resources are divided into orthogonal or pseudo-orthogonal codes over a certain time-frequency interval.

Figure 2:
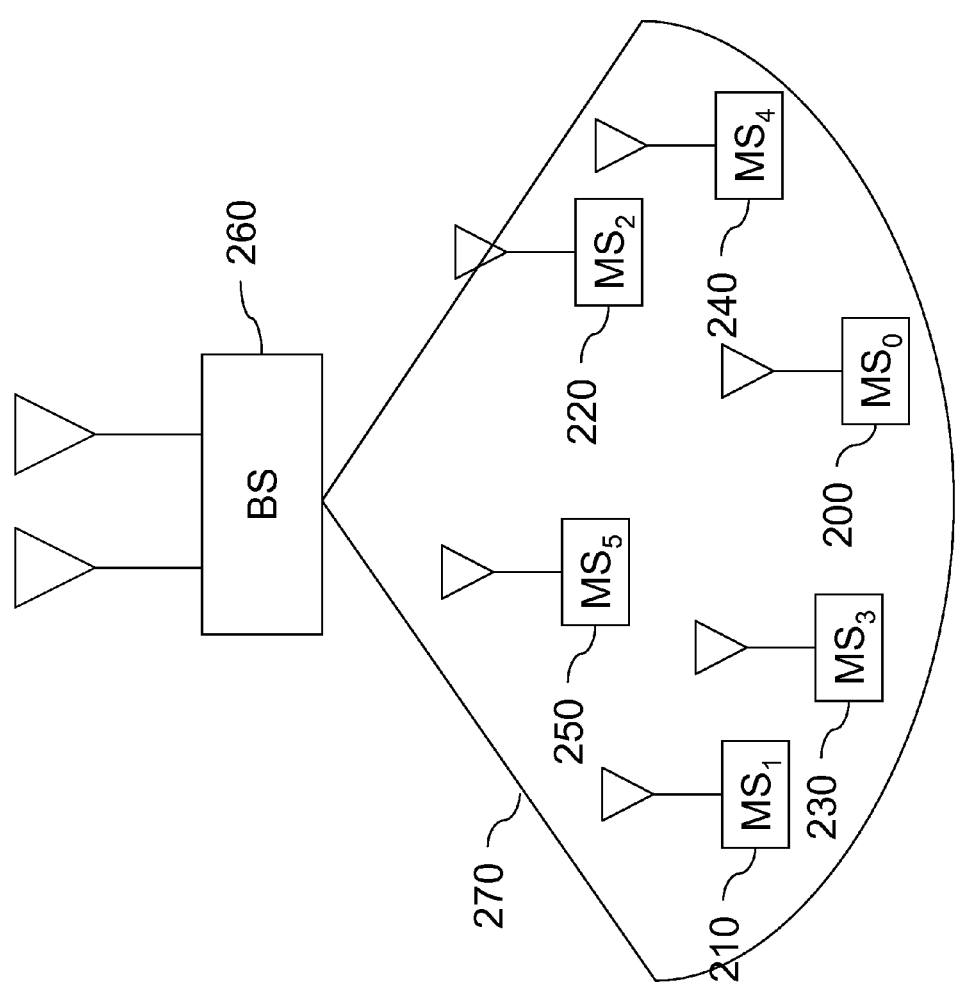
FIG. 2 illustrates a base station and several mobile stations from a wireless communications network.

FIG. 2 illustrates one base station and several mobile stations from the wireless communications network of FIG. 1. As is known in the art, the coverage area, or cell, of a base station 260 can be divided into, typically, three sub-coverage areas or sectors, one of which is shown 270. Six exemplary mobile stations 200, 210, 220, 230, 240, 250 are in the shown coverage area. The base station typically assigns each mobile station one or more connection identifiers, (CID) (or another similar identifier) to facilitate time-frequency resource assignment. The CID assignment can be transmitted from the base station to the mobile station on a control channel, can be permanently stored at the mobile station, or can be derived based on a mobile station or base station parameter.

Figure 3:
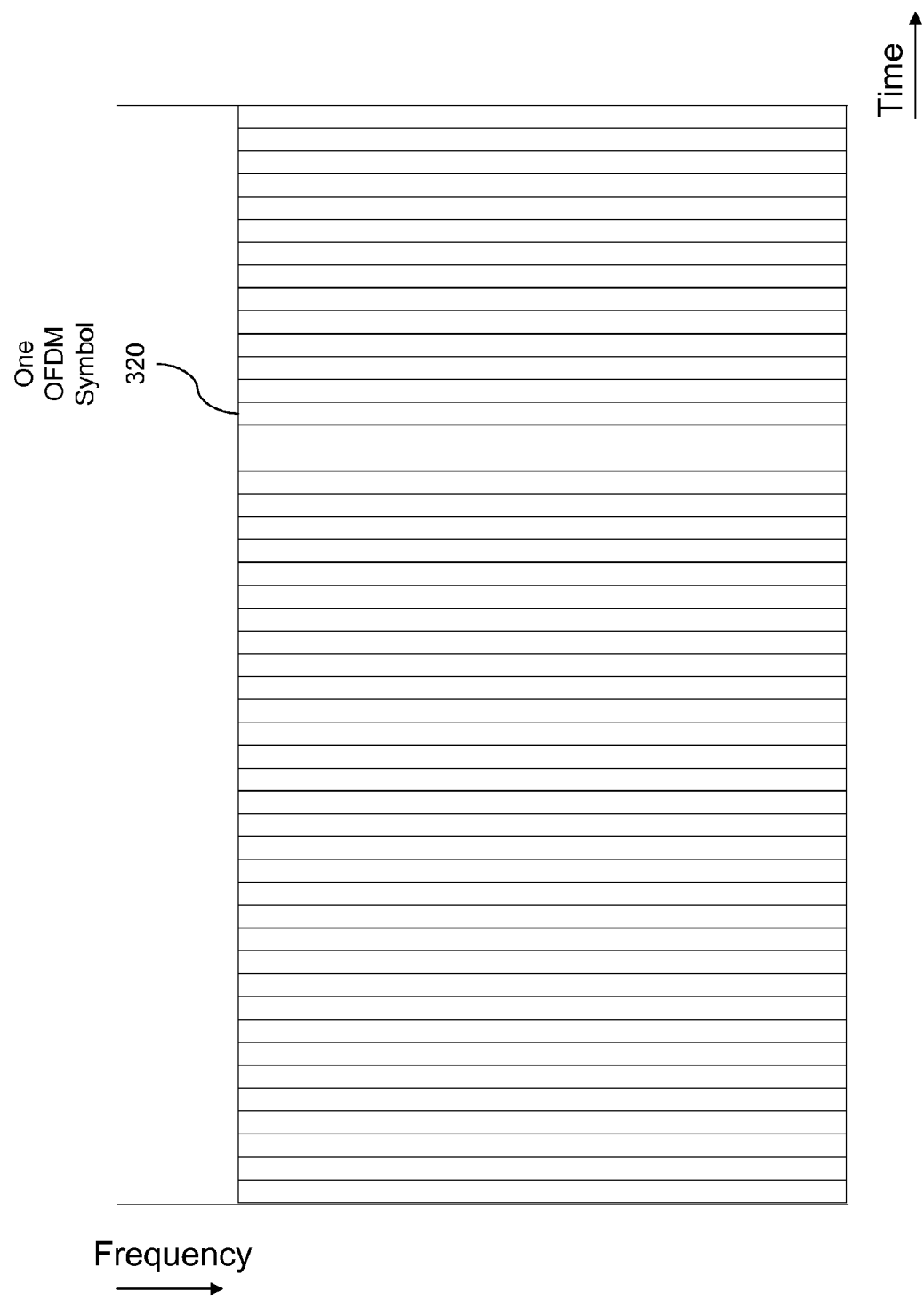
FIG. 3 illustrates an example set of OFDMA time-frequency radio resources.

FIG. 3 schematically illustrates an exemplary set of OFDMA time-frequency radio resources. In OFDMA systems, the time-frequency resources are divided into OFDM symbols and OFDM subcarriers for allocation to respective mobile stations by a base station scheduler. In an exemplary OFDMA system, the OFDM subcarriers are approximately 10 kHz apart and the duration of each OFDM symbol is approximately 100 μsec. FIG. 3 illustrates one 5 msec frame of an OFDMA system, such as that defined by the IEEE 802.16e standard. Referring to FIG. 3, in this exemplary embodiment, resources in the time domain (x-axis) are divided into 48 OFDM symbols 320. In the frequency domain (y-axis), the resources are divided into multiple subchannels (not shown), wherein the size of the subchannel depends on the subcarrier permutation scheme, as will be discussed in more detail later.

Figure 4:
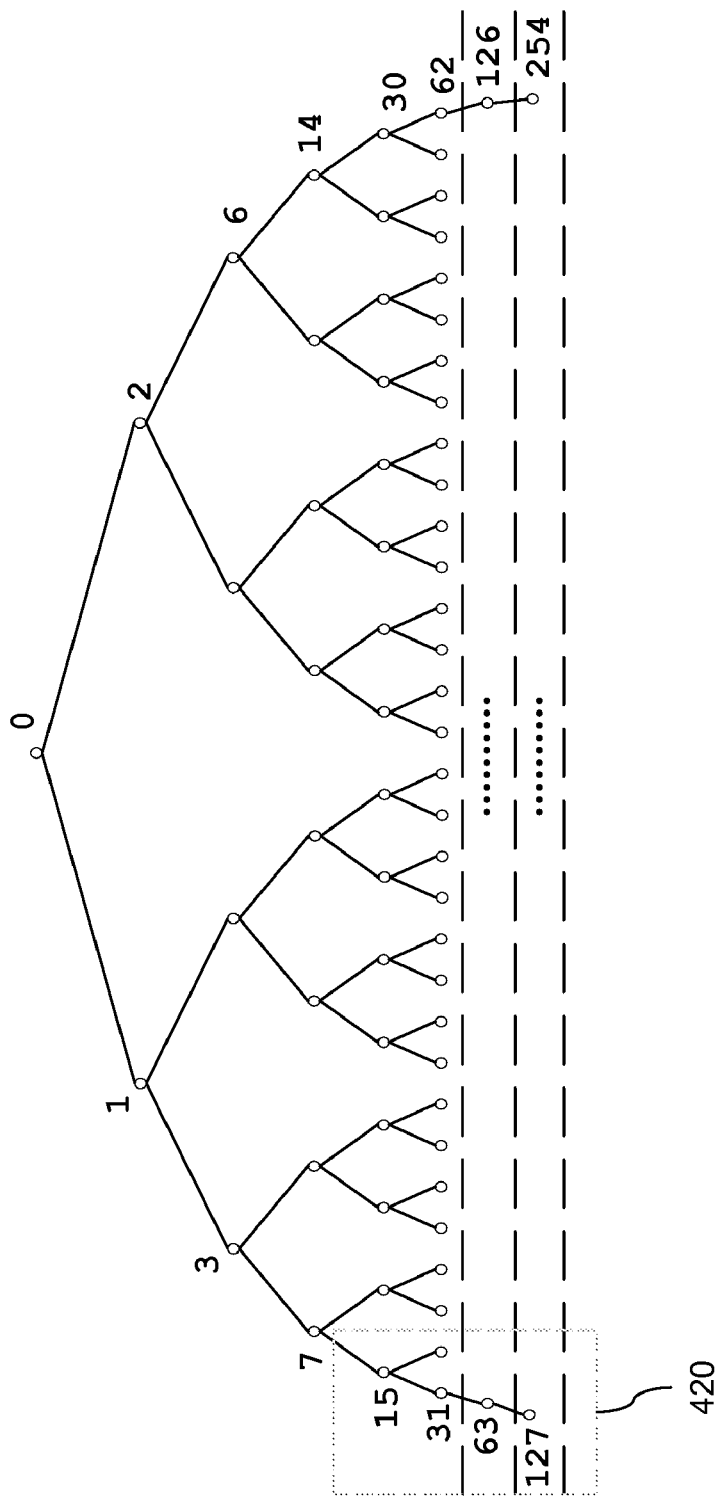
FIGS. 4-5 illustrate an example channel tree.
Figure 5:
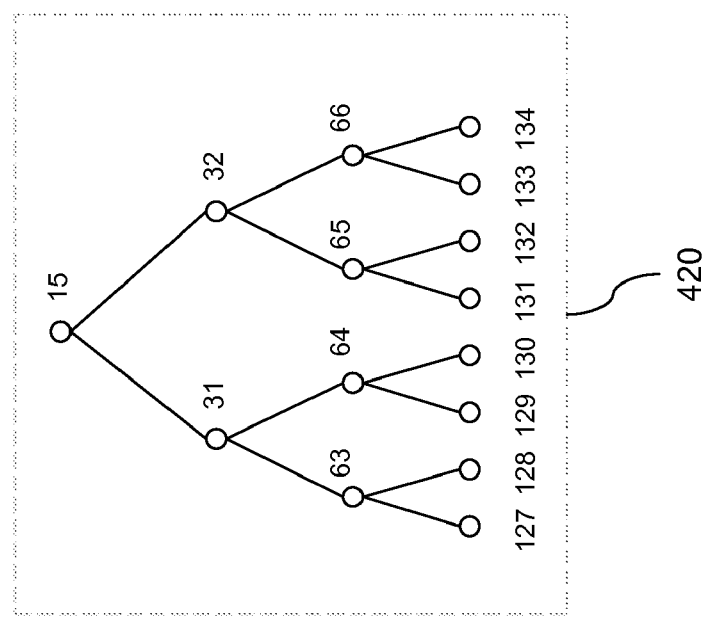

FIGS. 4-5 illustrate an exemplary channel tree, which is used to logically illustrate the division of time-frequency resources. Referring to FIG. 4, the main parent node, labeled as node 0, represents the entire set of time-frequency resources. In this channel tree, each node is sub-divided into two nodes. Therefore, the main parent node, node 0, is sub-divided into parent nodes 1 and 2. Parent nodes 1 and 2 each represent fifty percent of the entire set of time-frequency resources. The lowest level nodes (nodes 127, 128, 129, . . . , 254) are referred to as base nodes. A base node represents the smallest time-frequency resource that can be allocated to a mobile station using the channel tree. It should be apparent that the amount of time-frequency resources represented by a base node is dependent upon the manner in which the overall available pool of time-frequency resources are logically divided; this is typically defined by a relevant telecommunications protocol or standard. The collection of nodes under parent node 15, enclosed by 420, is enlarged and depicted in FIG. 5. Referring to FIG. 5, parent node 15 is divided into parent nodes 31 and 32. Parent node 31 is divided into parent nodes 63 and 64, and parent node 32 is divided into parent nodes 65 and 66. Parent node 63 is divided into base nodes 127 and 128, parent node 64 is divided into base nodes 129 and 130, parent node 65 is divided into base nodes 131 and 132, and parent node 66 is divided into base nodes 133 and 134.

Each channel tree node corresponds to a physical portion of the time-frequency resources. For example, consider an OFDMA system containing 384 useful subcarriers, indexed 0 to 383. In one exemplary channel tree configuration, node 0 corresponds to subcarriers 0 through 383, node 1 corresponds to subcarriers 0 through 191, and node 2 corresponds to subcarrier 192 through 384. In another exemplary channel tree configuration, node 0 corresponds to subcarriers 0 through 383, node 1 corresponds to subcarriers 0, 2, 4, . . . , 382, and node 2 corresponds to subcarrier 1, 3, 5, . . . , 383. The mapping of logical channel tree nodes to physical time-frequency resources may change with time and may be different in different sectors. Any mapping of logical channel tree nodes to physical time-frequency resources is possible, as long as the mapping scheme is known at the base station and the mobile station. The mapping scheme can be stored at a base station and a mobile station, transmitted to a mobile station from a base station, determined at a mobile station based on a parameter received from a base station, combinations of the above, and the like.

Figure 6:
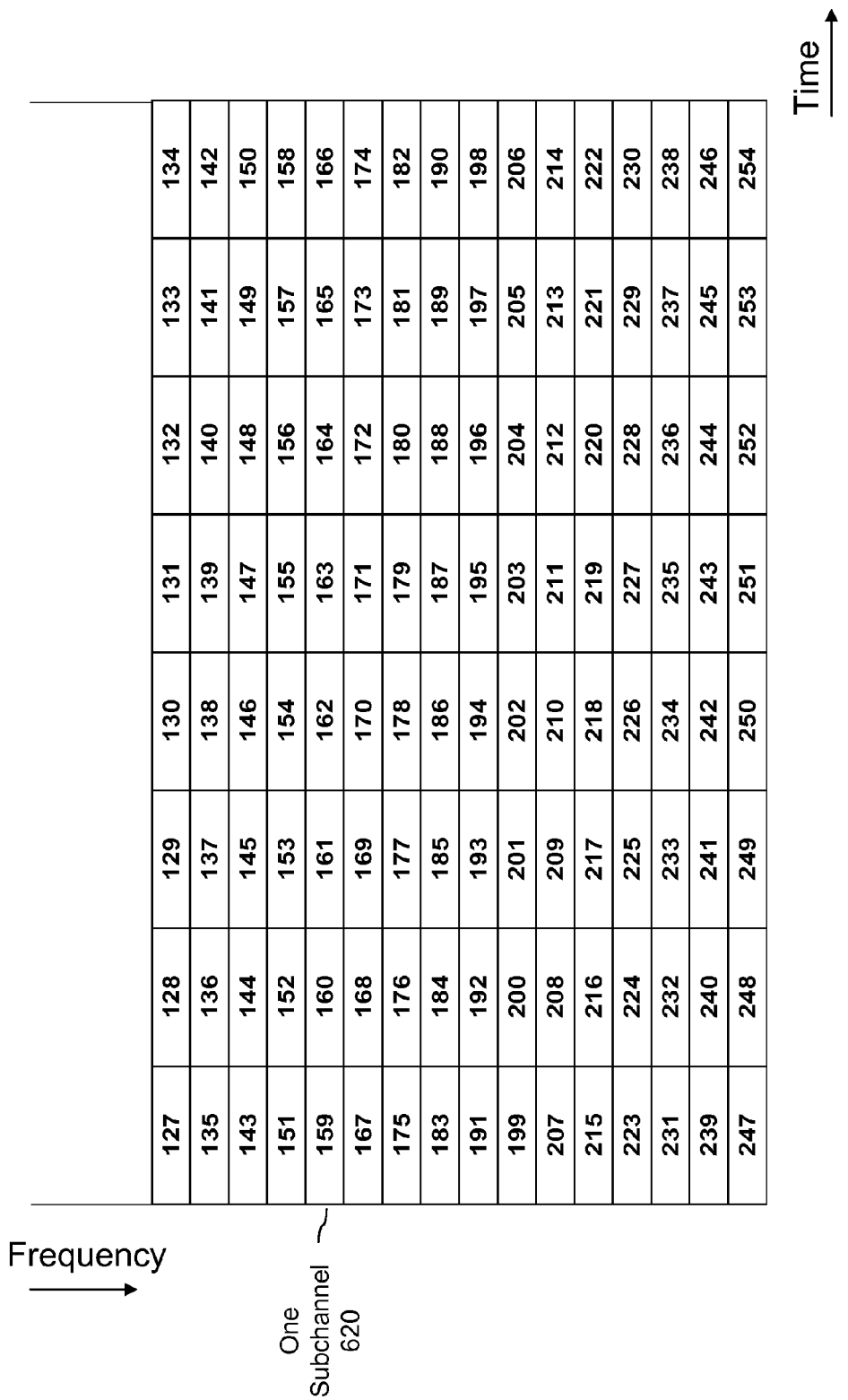
FIG. 6 illustrates base node assignments for the set of OFDMA time-frequency radio resources of FIG. 3.

FIG. 6 illustrates exemplary base node assignments for the set of OFDMA time-frequency radio resources of FIG. 3. Referring to FIG. 6, consider that there are 320 data subcarriers available in the frequency domain, which are divided into 16 subchannels, each containing 20 subcarriers, such as exemplary subchannel 620. Note that the 20 subcarriers in each subchannel may be contiguous or distributed across a larger bandwidth, so like the channel tree itself, each subchannel of FIG. 6 is a logical representation of a frequency domain resource. Further, consider an embodiment wherein each base node is 1 subchannel by 6 OFDM symbols. FIG. 6 shows exemplary base node assignments for this case. Combining the base node numbering scheme of FIG. 6 and the channel tree of FIG. 4, the base station can make time frequency assignments simply by transmitting a channel identifier to the mobile station, wherein the channel identifier is an index to the channel tree. The mobile station determines its time-frequency assignment based on knowledge of the channel tree and the base node numbering scheme. For example, if the base station assigns a mobile station channel identifier 15, the mobile station determines its assignment as base nodes 127-134 based on the channel tree and determines the corresponding physical time-frequency resources based on a known mapping of the subchannels of FIG. 6.

Figure 7:
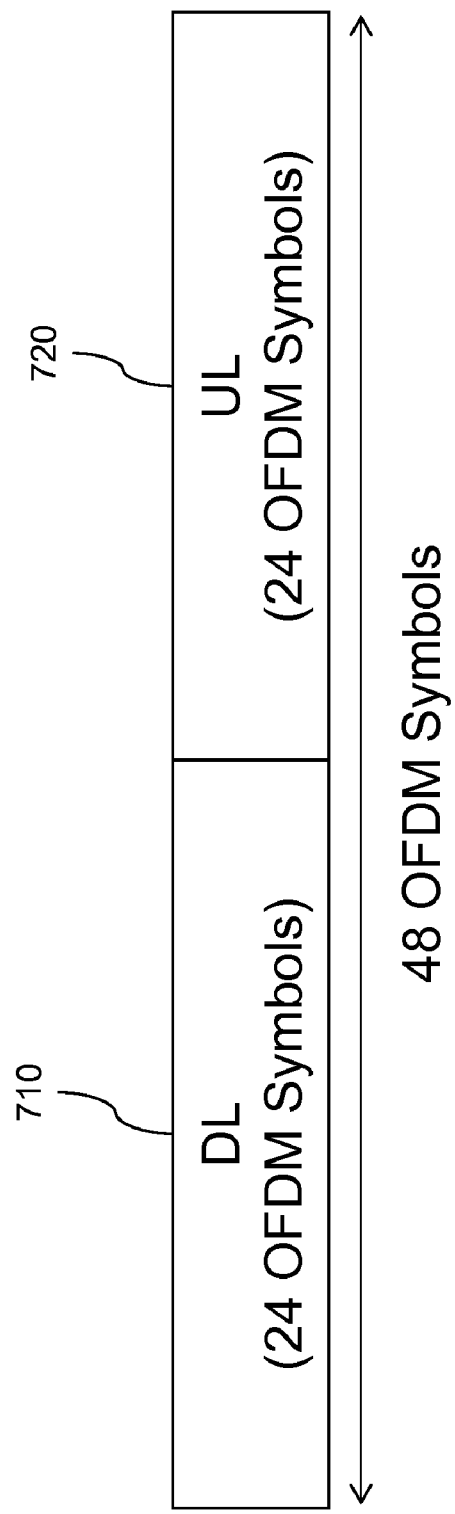
FIG. 7 illustrates the division of the time domain into downlink and uplink regions.

FIG. 7 illustrates the division of the time domain into downlink and uplink regions. Referring to FIG. 3, note that there are 48 OFDM symbols in each 5 msec frame. For TDD systems, the resources must be shared by the DL and the UL. If half of the symbols are devoted to the DL and half of the symbols are devoted to the UL, the time domain is divided into two regions as shown in FIG. 7. Note that the guard interval between the DL and UL is ignored for clarity of illustration, although the presence and configuration of a guard interval will be apparent to one skilled in the art. Referring to FIG. 7, DL region 710 preferably contains 24 OFDM symbols, and UL region 720 preferably contains 24 OFDM symbols. In some embodiments, a base station transmits an indication of the DL/UL split to the mobile station on a control channel. This indication can be the first OFDM symbol number of the UL, an indication of the DL/UL ratio, and the like.

Within each region, subcarrier permutations are defined by a base station. DL PUSC, DL FUSC, and UL PUSC are exemplary subcarrier permutations schemes defined in the IEEE 802.16 standard. Other permutation schemes are also defined in the IEEE 802.16 standard; DL PUSC, DL FUSC, and UL PUSC are merely used to illustrate the invention. Any subcarrier permutation scheme could be used each region. For DL PUSC, there are preferably 360 data subcarriers divided into 15 subchannels, wherein each subchannel has 24 subcarriers. For DL PUSC, the base station assigns an even number of OFDM symbols for each subchannel, per convention. For DL FUSC, there are 384 data subcarriers divided into 8 subchannels, wherein each subchannel has 48 subcarriers. For UL PUSC, there are 408 subcarriers (data plus pilot) divided into 17 subchannels, wherein each subchannel has 24 subcarriers (16 data plus 8 pilot). For UL PUSC, the number of OFDM symbols for each subchannel is a multiple of 3, per convention. For example, the base station can associate DL region 710 with the DL PUSC subcarrier permutation and UL region 720 with the UL PUSC subcarrier permutation.

Once the time-frequency resources of the system are divided into more than one region, the straightforward base node numbering scheme of FIG. 6 is no longer applicable for the following three reasons:

a. The size and shape of base nodes can be different in each region.
  b. Region boundaries change with time and may not occur within a single base node.
  c. It is not desirable for higher layer base nodes to span multiple regions.

To mitigate these problems, a new base node numbering scheme is provided, as described herein. To facilitate this numbering scheme, the base station first establishes the size of a base node for each region. The base node size for each region can be transmitted from the base station to the mobile station using a control channel or can be predefined and stored in a table at the base station and mobile station. In some embodiments, the base node size varies with the region size based on a rule or equation. For example, the base node size can increase as the region size increases. As an illustrative example, the base node size for DL PUSC can be 1 OFDM subchannel by 6 OFDM symbols, the base node size for DL FUSC can be 1 OFDM subchannel by 3 OFDM symbols, and the base node size for UL PUSC can be 1 OFDM subchannel by 9 OFDM symbols. Note that this base node size is a typical size and that some base nodes may have a slightly different size as will be discussed in more detail later.

If there is only one definition of a base node for each subcarrier permutation, the mobile station determines the size of the base node based on knowledge of the subcarrier permutations, which are derived at the mobile station based on the region boundaries. If there is more than one definition of a base node for each subcarrier permutation, the base station transmits an indication of the base node size for each subcarrier permutation to the mobile station using a control channel.

In the example above, the base node data size, in terms of the number of data subcarriers multiplied by the number of data symbols, is constant across region boundaries. Therefore, for DL PUSC, each base node is 1 OFDM subchannel (having 24 subcarriers) by 6 OFDM symbols for a base node data size of 144 (6*24). For DL FUSC, each base node is 1 OFDM subchannel (having 3 subcarriers) by 3 OFDM symbols for a base node data size of 144 (3*48). For UL PUSC, each base node is 1 OFDM subchannel by 9 OFDM symbols for a base node data size of 144 (9*16). Note that for DL PUSC, in the IEEE 802.16 standard, the term slot is used to refer to 1 OFDM subchannel by 2 OFDM symbols, for DL FUSC, the term slot is used to refer to 1 OFDM subchannel by 1 OFDM symbol, and for UL PUSC, the term slot is used to refer to 1 OFDM subchannel by 3 OFDM symbols. Based on the varying definition of the term slot, the base node data size is defined to have the same number of slots in each region. One skilled in the art will recognize that the disclosure of the illustrative embodiments can be readily extended to other and additional subcarrier permutations and protocols.

Figure 8:
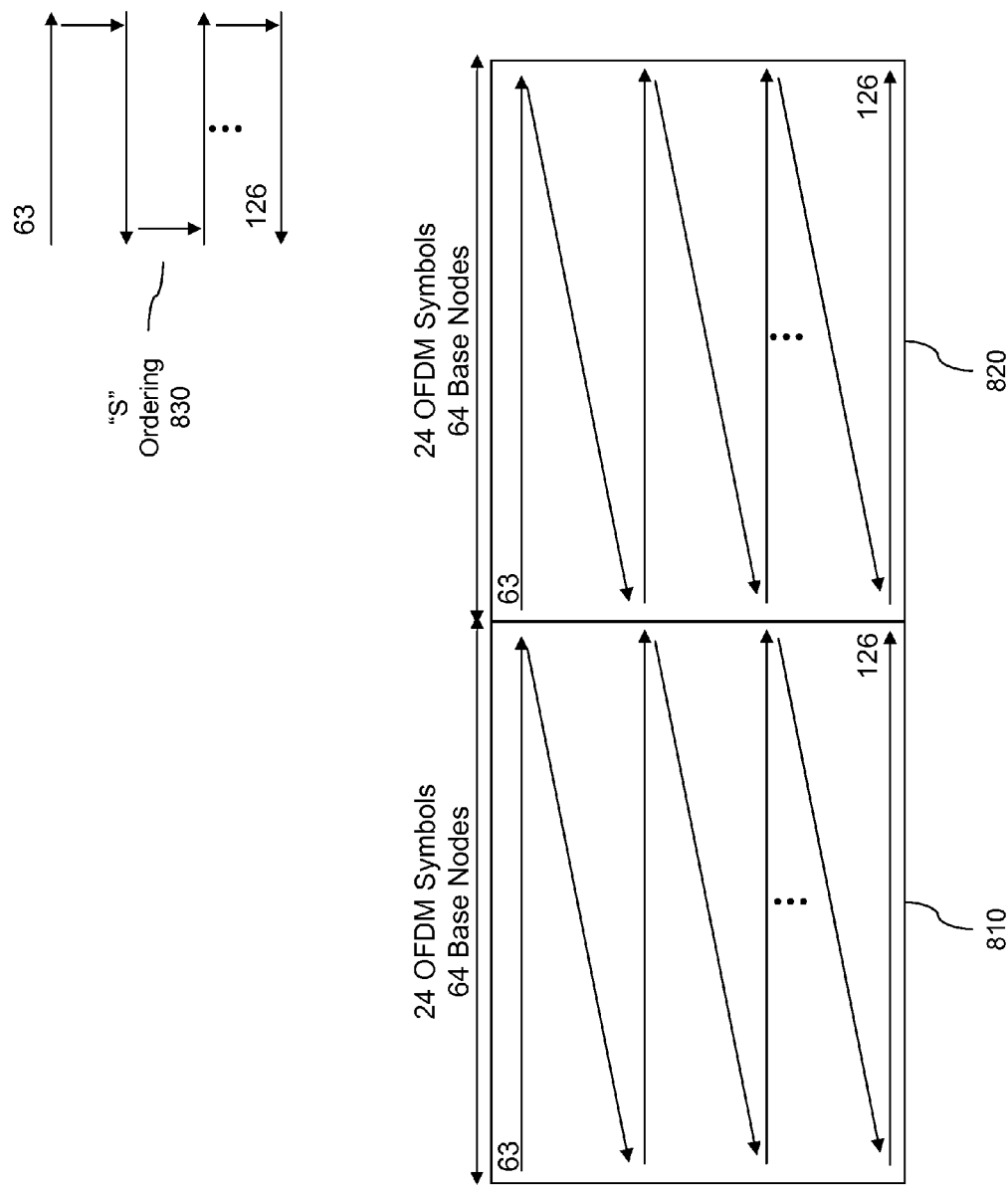
FIG. 8 illustrates an exemplary base node numbering scheme for the regions defined in FIG. 7.

FIG. 8 illustrates a new numbering scheme for one embodiment of the present invention. Referring to FIG. 8, consider that a base station has transmitted exemplary region boundaries to associated mobile stations and an indication that DL region 810 will use the DL PUSC subcarrier permutation and UL region 820 will use the UL PUSC subcarrier permutation, for example. DL PUSC region 810 is preferably 15 subchannels by 24 OFDM symbols, by convention. The area of this region is defined as the number of frequency domain units times the number of time domain units. For exemplary DL PUSC region 810, the area is 360. The area of each base node is similarly defined, and, for exemplary DL PUSC region 810, the area of each base node is 6 (recall from the previous paragraph that a base node is defined as 1 OFDM subchannel by 6 OFDM symbols, for an area of 6). UL PUSC region 820 is preferably 17 subchannels by 24 OFDM symbols, by convention. The area of this region is defined as the number of frequency domain units times the number of time domain units. For the UL PUSC region 820, the area is 408. The area of each base node is similarly defined, and, for UL PUSC region 820, the area of each base node is 9.

Within each region, a base station and mobile station use a common algorithm for determining the number of base nodes in each region based on the area of the region and the area of each base node. The algorithm is different for different channel tree structures. For example, the number of channel tree base nodes for a power of 2 channel tree, such as the one in FIG. 4, can be defined as $$BaseNodes_{CT} = 2^{\left(\lceil \log_2\left(\lceil \frac{RegionArea}{BaseNodeArea} \rceil\right)\rceil\right)}.$$

For DL PUSC region 810, the number of base nodes is 64. For UL PUSC region 820, the number of base nodes is 64. The number of base nodes which map to physical time-frequency resources is defined using a similar algorithm. For example, the number of base nodes which map to physical time-frequency resources can be defined as $$BaseNodes_{TF} = \left\lfloor \frac{RegionArea}{BaseNodeArea} \right\rfloor.$$

For DL PUSC region 810, the number of base nodes which map to physical time-frequency resources is 60. For UL PUSC region 820, the number of base nodes which map to physical time-frequency resources is 45. To maintain a channel tree structure for the case when the number of channel tree base nodes is larger than the number of base nodes which map to physical time-frequency resources, the concept of imaginary base nodes is used. The number of imaginary base nodes is defined as $$BaseNodes_{IMAG} = BaseNode_{CT} - BaseNodes_{TF}.$$

For DL PUSC region 810, there are 4 imaginary base nodes. For UL PUSC region 820, there are 19 imaginary base nodes. The imaginary base nodes can be located anywhere on the channel tree as long as it is known at the base station and mobile station. For example, the imaginary base nodes can always be at the end of the channel tree. Alternatively, $\lceil BaseNodes_{IMAG}/2 \rceil$ can be placed at the beginning of the channel tree and $\lfloor BaseNodes_{IMAG}/2 \rfloor$ can be placed at the end of the channel tree. Alternatively, the imaginary base nodes can be distributed throughout the region.

For the case when the region area divided by the base node area is not an integer, one or more base nodes will have a size different than the typical base node. Again, any algorithm for handling this special case can be used as long as it is known at the base station and mobile station. For example, the last base node can be larger than the typical base node with an area defined as $$LastBaseNodeArea = $$
$$BaseNodeArea\left(1 + \frac{RegionArea}{BaseNodeArea} - \left\lfloor \frac{RegionArea}{BaseNodeArea} \right\rfloor\right).$$

The numbering of base nodes can follow any pattern as long as it is known at the base station and mobile station. For example, the first base node can be defined as $BaseNodes_{CT}$-1 and the base nodes can be numbered in time first followed by frequency in a zigzag pattern as shown in FIG. 8. In some embodiments, an "S" ordering 830 is used instead of the zigzag pattern. In some embodiments, the bases nodes are numbered in frequency first followed by time in a zigzag pattern (not shown). In some embodiments, the base nodes are numbered in a diagonal pattern to ensure that consecutive base nodes occupy different OFDM symbols and different OFDM subchannels. Such a numbering scheme improves frequency diversity. Any base node numbering scheme can be used as long as the numbering scheme is known at the base station and mobile station. Referring to FIG. 8, within DL PUSC region 810, the base nodes are numbered in time first followed by frequency from 63 to 126 in a zigzag pattern. Similarly, within UL PUSC region 820, the base nodes are numbered in time first followed by frequency from 63 to 126 in a zigzag pattern.

Figure 9:
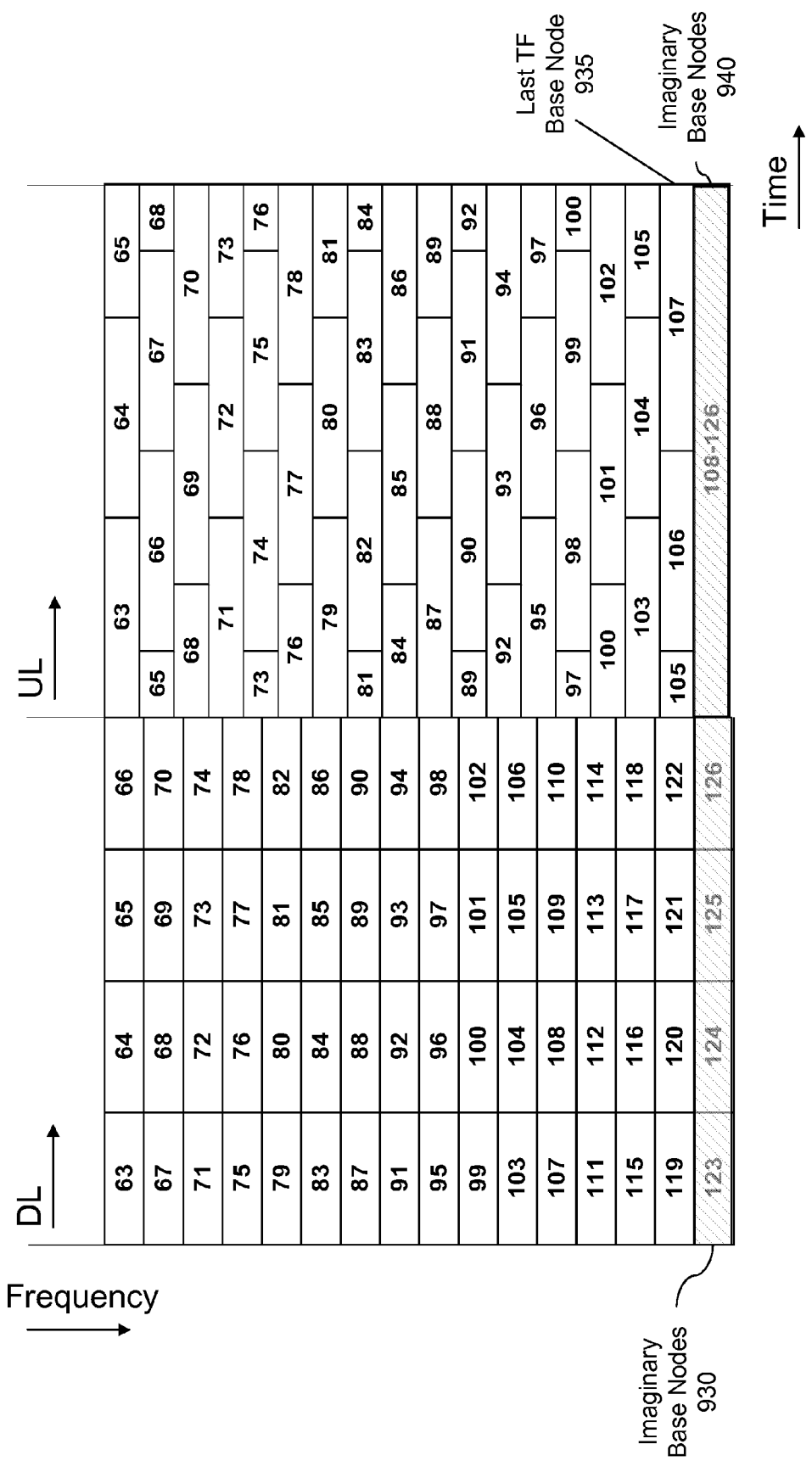
FIG. 9 illustrates base node assignments for the set of OFDMA time-frequency radio resources of FIG. 3 based on the regions defined in FIG. 7 for PUSC.

FIG. 9 illustrates base node assignments for the set of OFDMA time-frequency radio resources of FIG. 3 based on the regions defined in FIG. 7. In this illustrative example, consider that the imaginary base nodes are placed at the end of the channel tree and that the last base node which maps to physical time-frequency resources is larger than the typical base node if the region area divided by the base node area is not an integer. Referring to FIG. 9, the DL PUSC region has base nodes numbered from 63 to 126. The last four base nodes, 123-126, do not map to physical time-frequency resources and are therefore imaginary base nodes 930. The UL PUSC region has base nodes numbered from 63-126. The last 19 base nodes (108-126) do not map to physical time-frequency resources and are therefore imaginary base nodes 940. The last base node which maps to physical time-frequency resources 935 has an area of 12 (rather than an area of 9) to account for the fact that the region area divided by the base node area is not an integer.

Figure 10:
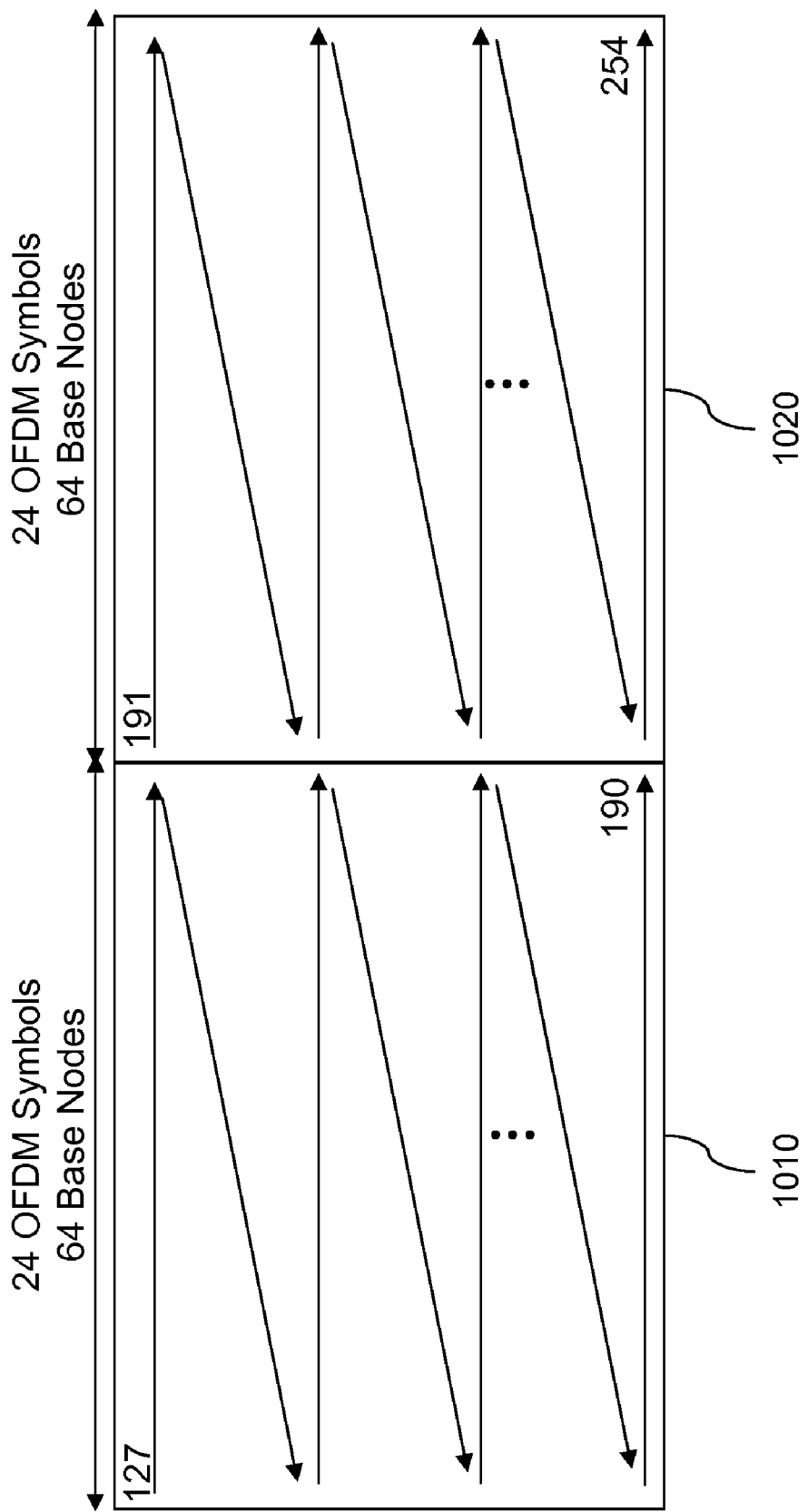
FIG. 10 illustrates another exemplary base node numbering scheme for the regions defined in FIG. 7.

In FIG. 8-9, a unique channel tree was defined for each region. This is advantageous, since the size of the channel tree is proportional to the size of the region and can therefore reduce the number of bits necessary to represent the channel tree. However, if multiple regions are defined, the total number of imaginary base nodes across all regions can result in an overall inefficiency. Therefore, in some embodiments, a common channel tree is defined, which spans multiple regions. Since assignments spanning multiple regions for the transmission of a single packet to a single mobile station are typically not allowed, it is desirable to minimize the number of channel tree nodes that have base nodes belonging to multiple regions. To accomplish this goal, a new base node numbering scheme is proposed, wherein base nodes are numbered first continuously within each region and second continuously across regions. FIG. 10 illustrates this numbering scheme for the regions defined in FIG. 7. Referring to FIG. 10, within each region, the number of base nodes is still maintained as a power of two and is determined as described above. The total number of base nodes in the channel tree is defined as $$BaseNode_{TOT} = \sum_{i=1}^{NumRegions} BaseNodes_{CT,i},$$

where NumRegions is the total number of regions. The first channel tree base node is defined as $BaseNode_{TOT}-1$.

To minimize the number of channel tree nodes that span multiple regions, the base node numbering begins with DL region 1010 and continues in time first followed by frequency from 127 to 190 in a zigzag manner. After the DL region is complete, the base node numbering continues with UL region 1020. Within the UL region, the base node numbering continues in time first followed by frequency from 191 to 254 in a zigzag manner. Using this numbering scheme, only channel tree node 0 has base nodes belonging to both the DL region and the UL region. In this illustrative example, the assignment of channel tree node 0 is not allowed.

As more regions are added in each of the DL and UL, one channel tree can be used which spans both the DL and UL as described above or one channel tree can be used for the multiple regions of the DL and another channel tree can be used for the multiple regions of the UL as will be illustrated in more detail later.

Figure 11:
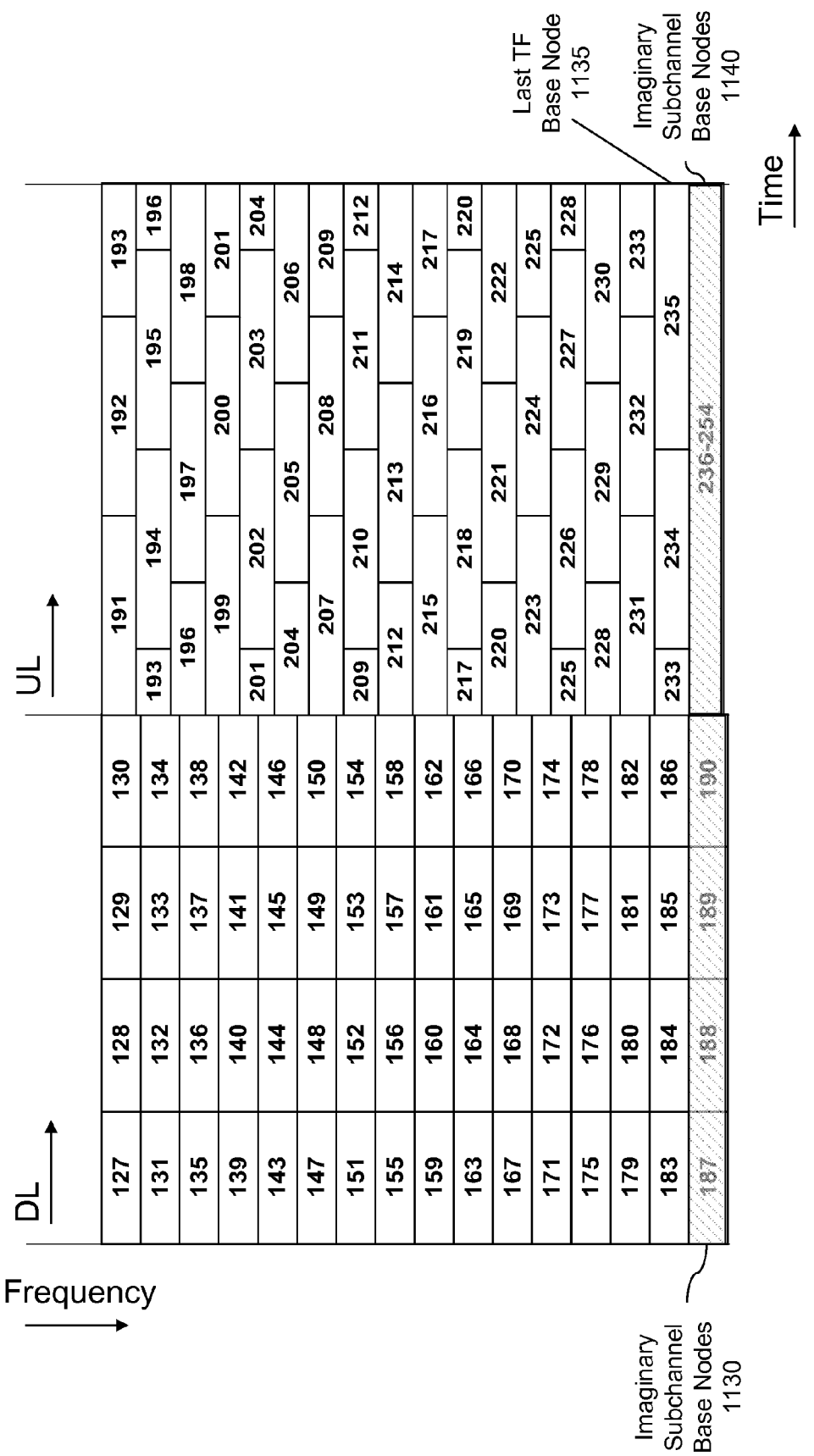
FIG. 11 illustrates base node assignments for the set of OFDMA time-frequency radio resource of FIG. 3 based on the regions defined in FIG. 7 for PUSC.

FIG. 11 illustrates base node assignments for the set of OFDMA time-frequency radio resources of FIG. 3 based on the regions defined in FIG. 7 for DL PUSC and UL PUSC. In this illustrative example, consider that the imaginary base nodes are placed at the end of the channel tree and that the last base node which maps to physical time-frequency resources is larger than the typical base node if the region area divided by the base node area is not an integer. Referring to FIG. 11, the DL PUSC region has base nodes numbered from 127 to 190. The last four base nodes, 187-190, do not map to physical time-frequency resources and are therefore imaginary base nodes 1130. The UL PUSC region has base nodes numbered from 191-254. The last 19 base nodes (236-254) do not map to physical time-frequency resources and are therefore imaginary base nodes 1140. The last base node which maps to physical time-frequency resources 1135 has an area of 12 to account for the fact that the region area divided by the base node area is not an integer.

Figure 12:
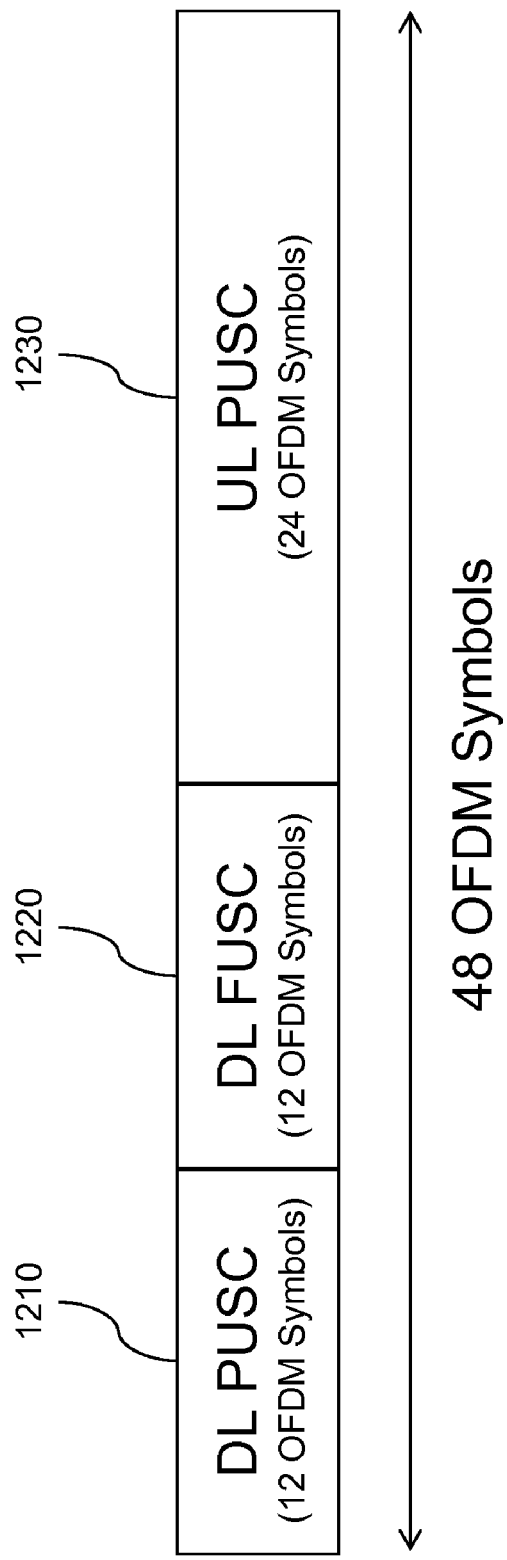
FIG. 12 illustrates the division of the time domain into downlink PUSC, downlink FUSC, and uplink PUSC regions.

FIG. 12 illustrates the division of the time domain into downlink PUSC, downlink FUSC, and uplink PUSC regions. Referring to FIG. 12, two regions are defined on the DL, namely a DL PUSC region 1210 and a DL FUSC region 1220, wherein each region has 12 OFDM symbols. On the UL, one region is defined, namely an UL PUSC region 1230, which has 24 OFDM symbols. The base station transmits an indication of the region boundaries to the mobile station on a control channel. For example, the base station could transmit a region definition message on a control channel, wherein the region definition message contains an indication of subcarrier permutation DL FUSC and OFDM symbol number 12 to the mobile station. Note that it could be known the DL PUSC is assumed until a region definition message is received, which overrides DL PUSC. In addition, the base station could transmit region definition message containing an indication of UL PUSC and OFDM symbol number 24 to the mobile station.

Figure 13:
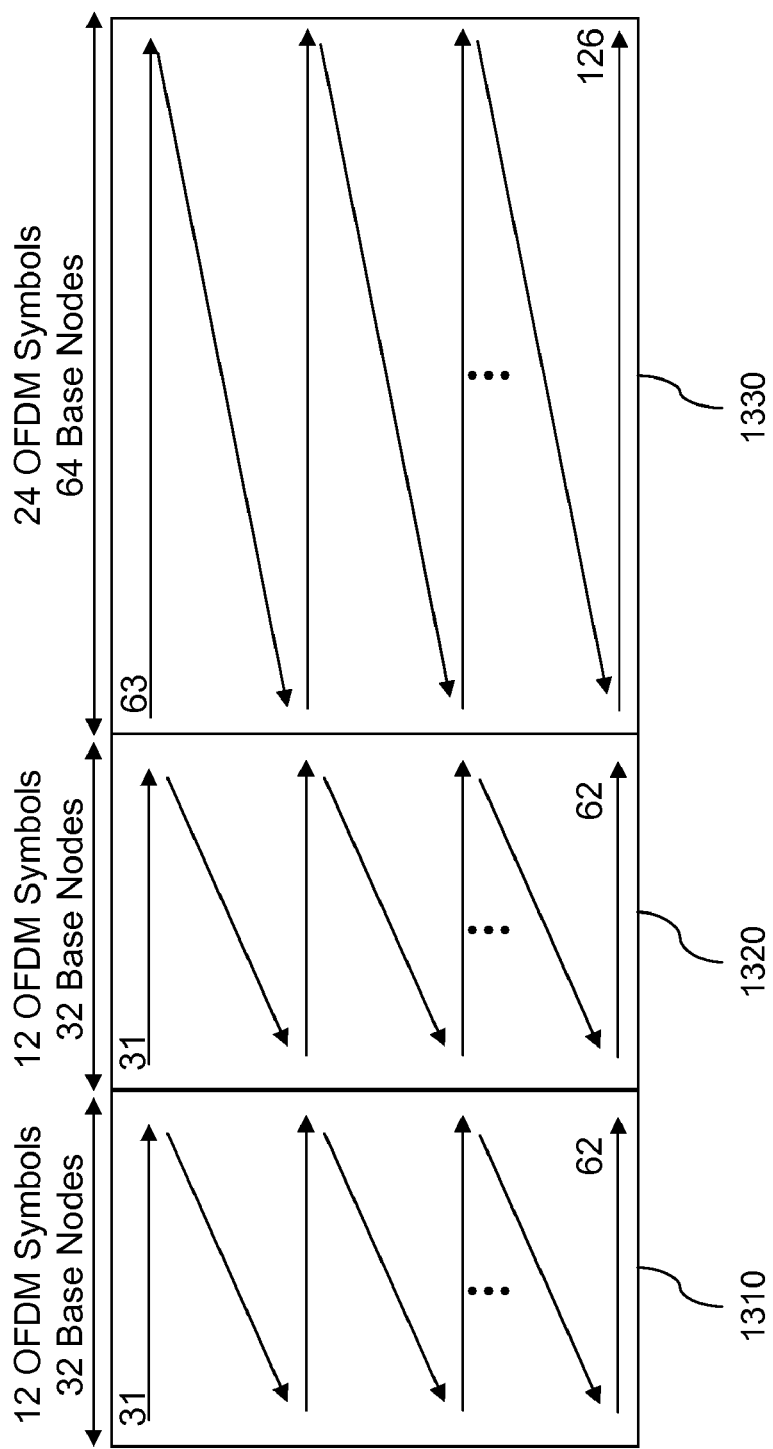
FIG. 13 illustrates one base node numbering scheme for the regions defined in FIG. 10.

FIG. 13 illustrates the base node numbering scheme for the regions defined in FIG. 12 for the case when unique channel trees are defined in each region. Referring to FIG. 13, for DL PUSC region 1310, the area of the region is 180, and the base node area is 6. Consequently, using the example algorithms above, there are 32 channel tree nodes. The base node numbering begins with base node 31 and continues in time first followed by frequency in a zigzag manner from base node 31 to base node 62 as shown. In the DL PUSC region 1310, there are 2 imaginary nodes. For DL FUSC region 1320, the area of the region is 96, and the base node area is 3. Consequently, using the example algorithms above, there are 32 channel tree nodes. The base node numbering begins with base node 31 and continues in time first followed by frequency in a zigzag manner from base node 31 to base node 62 as shown. In DL FUSC region 1320, there are no imaginary nodes. For UL PUSC region 1330, the area of the region is 408, and the base node area is 9. Consequently, using the example algorithms above, there are 64 channel tree nodes. The base node numbering begins with base node 63 and continues in time first followed by frequency in a zigzag manner from base node 63 to base node 126 as shown. In UL PUSC region 1330, there are 19 imaginary nodes.

Figure 14:
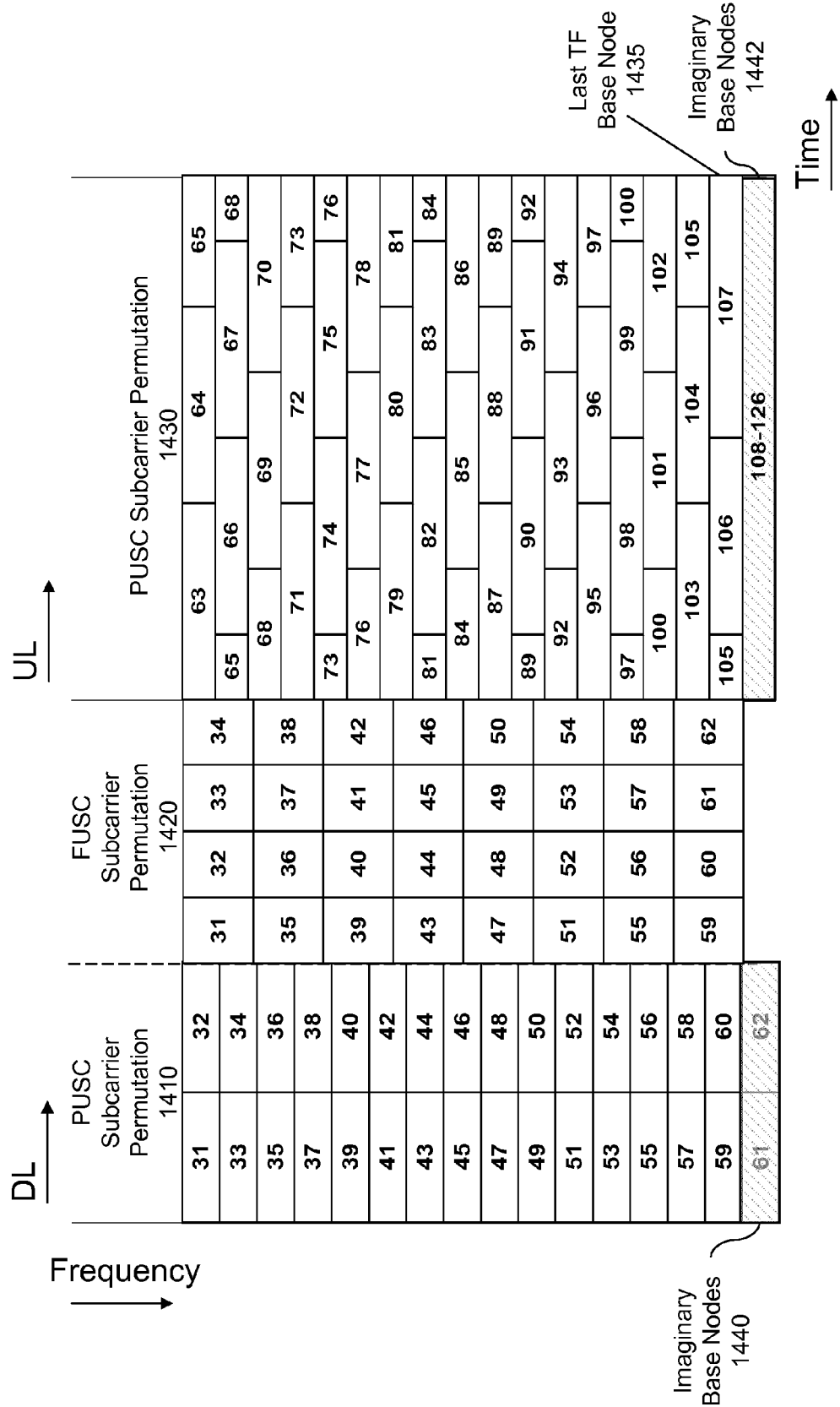
FIG. 14 illustrates base node assignments for the set of OFDMA time-frequency radio resources of FIG. 3 based on the regions defined in FIG. 13.

FIG. 14 illustrates base node assignments for the set of OFDMA time-frequency radio resource of FIG. 3 based on the regions defined in FIG. 12. Referring to FIG. 14, the base nodes are numbered within DL PUSC region 1410 from 31 to 62, as shown, with base nodes 61-62 representing imaginary base nodes 1440. The base nodes are numbered within DL FUSC region 1420 from 31 to 62 as shown with no imaginary base nodes. The base nodes are numbered within UL PUSC region 1430 from 63-126, as shown, with base nodes 108-126 representing imaginary base nodes 1442. The last channel tree base node which maps to physical time-frequency 1435 has an area of 12.

Figure 14A:
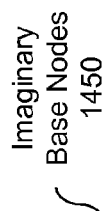
FIG. 14A illustrates an additional example of imaginary base nodes.

To further illustrate how imaginary base nodes can be utilized, FIG. 14A is provided. In FIG. 14A, a DL FUSC region containing 9 OFDM symbols is provided. In this example, using the equations above, there are 8 imaginary base nodes. In this example, the imaginary base nodes 1450 are placed following every third base node. Recall from FIG. 4 that, channel tree node 7 corresponds to base nodes 31-34, channel tree node 8 corresponds to base nodes 35-38, and so on. By placing the imaginary nodes in this way, the base station ensures that it can assign the entire time domain of the region for each subchannel using a single channel tree node. In general, in some embodiments, imaginary base nodes are used to ensure that the number of base nodes in the time domain is a power of 2 (2, 4, 8, 16, . . . ). Similarly, in some embodiments, imaginary base nodes are used to ensure that the number of base nodes in the frequency domain is a power of 2.

FIG. 14B is provided as an additional example of imaginary base nodes. Referring to FIG. 14B, a DL PUSC region containing 6 OFDM symbols is illustrated. However, in this case, the base node size is 3 subchannels by 2 OFDM symbols. The base node numbering begins with 15 and continues to 29 for real base nodes. In this example, using the equations above, there is 1 imaginary base node 1455.

In some embodiments, as a parallel to imaginary base nodes, merged subchannel base nodes 1460 (see also 1650 of FIG. 16) are used to ensure that either the number of base nodes in the time domain or frequency domain is a power of 2. To illustrate this concept, FIG. 14C is provided. In FIG. 14C, an UL PUSC region is depicted, which spans 6 OFDM symbols. In this example, consider that the base node size for UL PUSC region is 1 OFDM subchannel by 6 OFDM symbols. Using the equations above, the region would have 17 real base nodes and 15 imaginary base nodes. In some embodiments, it is not desirable to have a large number of imaginary base nodes, so the concept of a merged subchannel base node is introduced. In FIG. 14C, the last two subchannels of the region are merged together forming a single subchannel 1460. In this way, there are 16 base nodes in the region, with the first 15 base nodes having a size of 1 OFDM subchannel by 6 OFDM symbols, and the last base node having a size of 2 OFDM subchannels by 6 OFDM symbols. Like imaginary base nodes, merged subchannel base nodes can be placed at any location in the region, as long as their location is known at the base station and mobile station. For example, it can be known that the last two subchannels of any UL PUSC region are always merged together.

Figure 15:
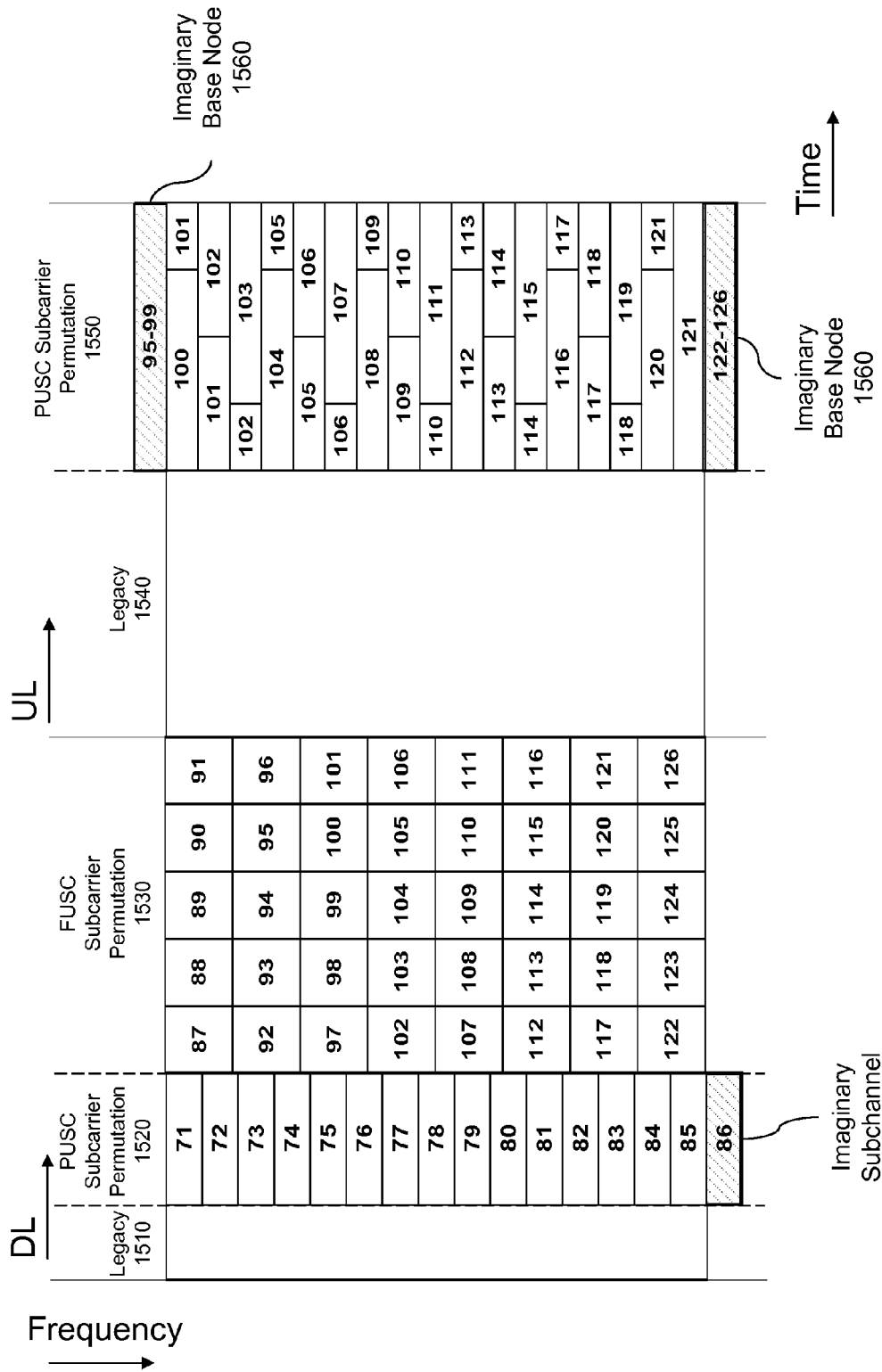
FIG. 15 illustrates base node assignments for the set of OFDMA time-frequency radio resource of FIG. 3 based on a different set of regions.

In some embodiments, legacy mobile stations will not be aware of the channel tree structure. In such a scenario, it may be desirable for the base station to allocate these mobile stations first in the DL and UL, thereby allowing the remaining time-frequency resources to be utilized by mobile stations that are aware of the channel tree structure. FIG. 15 illustrates base node assignments for the set of OFDMA time-frequency radio resources of FIG. 3 when legacy regions are defined for the case when one common channel tree is defined across the DL region and another common channel tree is defined across the UL regions. Referring to FIG. 15, a DL legacy region 1510 containing 3 OFDM symbols is defined, followed by a DL PUSC region 1520 of 6 OFDM symbols, followed by a DL FUSC region 1530 of 15 OFDM symbols, followed by a UL legacy region 1540 of 12 OFDM symbols, followed by a UL PUSC region 1550 of 12 OFDM symbols. The legacy mobile stations are not aware of the channel tree structure used by the new mobile stations, and the new mobile stations do not necessarily need to know what subcarrier permutation is used in the legacy regions. Within the DL regions, the base node numbering begins with 63+8/3*(OFDM Symbol Number) and continues within the region, with the numbering for all regions shown in FIG. 15. Within the UL regions, the base node numbering begins with 63+8/3*(OFDM Symbol Number—24), since the UL begins with symbol number 24. DL base nodes 86 and UL base nodes 95-99 and 122-126 are labeled as imaginary base nodes 1560 as previously described. The last base node, labeled as base node 121, has an area of 15, since the area of the region divided by the area of the typical base node is not an integer. In the example of FIG. 15, for the UL PUSC region 1550, half of the imaginary base nodes are placed at the beginning of the channel tree and half of the imaginary base nodes are placed at the end of the channel tree.

Figure 16:
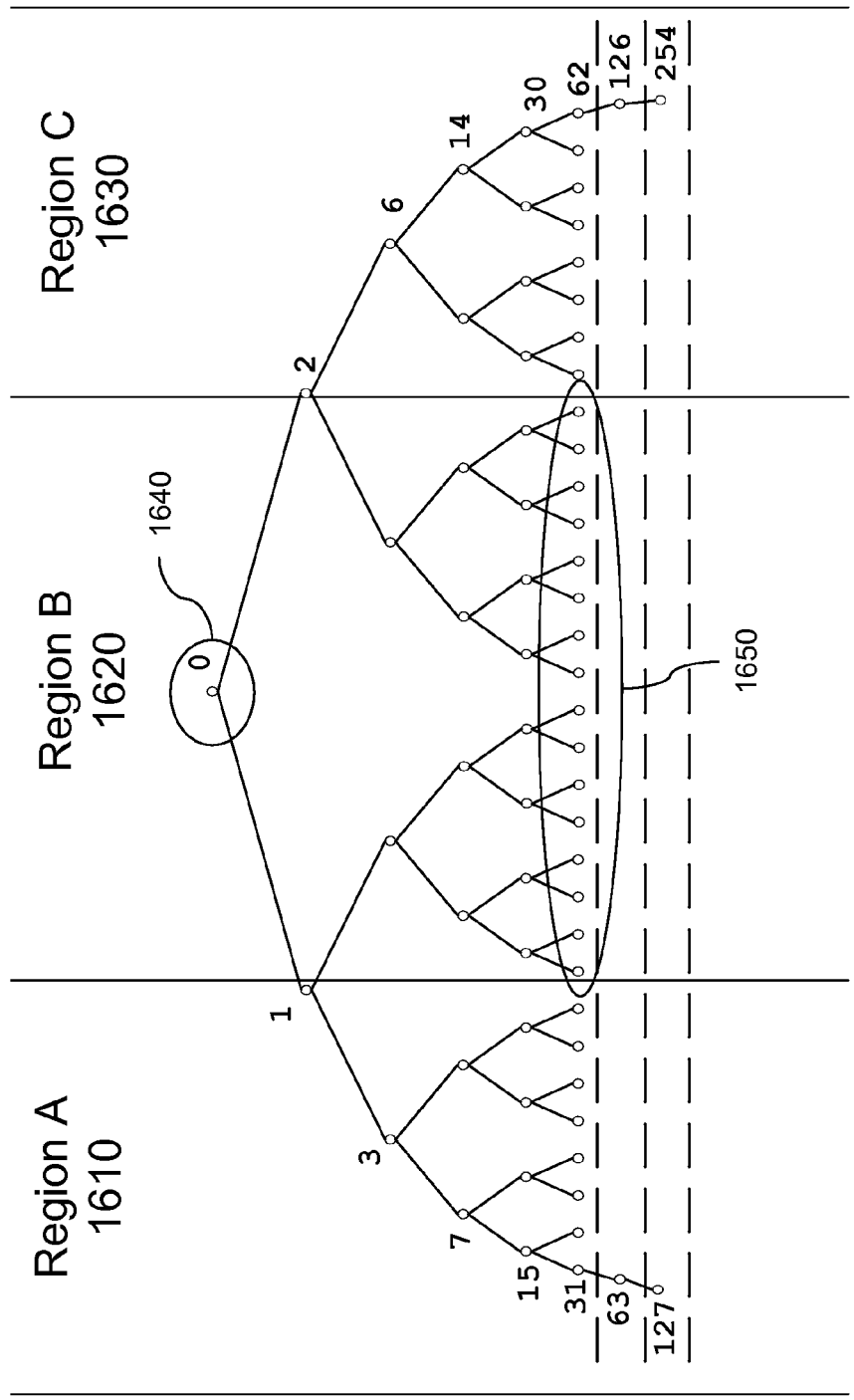
FIG. 16 illustrates how base nodes are derived from parent nodes when the parent node spans multiple regions.

FIG. 16 is an illustrative example of how base nodes are derived from parent nodes when the parent node spans multiple regions. When multiple regions are defined using the same channel tree, one or more channel tree nodes will exist that span multiple regions. Some channel tree nodes are not allowed as previously discussed. However, in some cases, a special definition must be applied to channel tree nodes in order to allow the full set of desired assignments. For example, referring to FIG. 16, consider that three regions are defined, namely region A 1610, region B 1620, and region C 1630. The entire set of base nodes in region A 1610 can be unambiguously represented by channel tree node 3, and the entire set of base nodes in region C 1630 can be unambiguously represented by channel tree node 6. However, there is no channel tree node that unambiguously represents the entire set of base nodes 1650 in region B 1620. To solve this problem, a special definition is given to channel tree nodes. For example, the following channel tree node definition can be used: for channel tree nodes that span multiple regions, the channel tree node corresponds to the largest number of base nodes within one region that cannot be equivalently represented by a lower channel tree node. Referring again to FIG. 16, based on this definition, channel tree node 0 1640 corresponds to the base nodes in region B 1650. Any mapping of higher layer nodes to base nodes can be used as long as the mapping is known at the base station and mobile station. For example, higher layer nodes can correspond to the collection of base nodes in the left most region, the right most region, or the closest base nodes.

Figure 17:
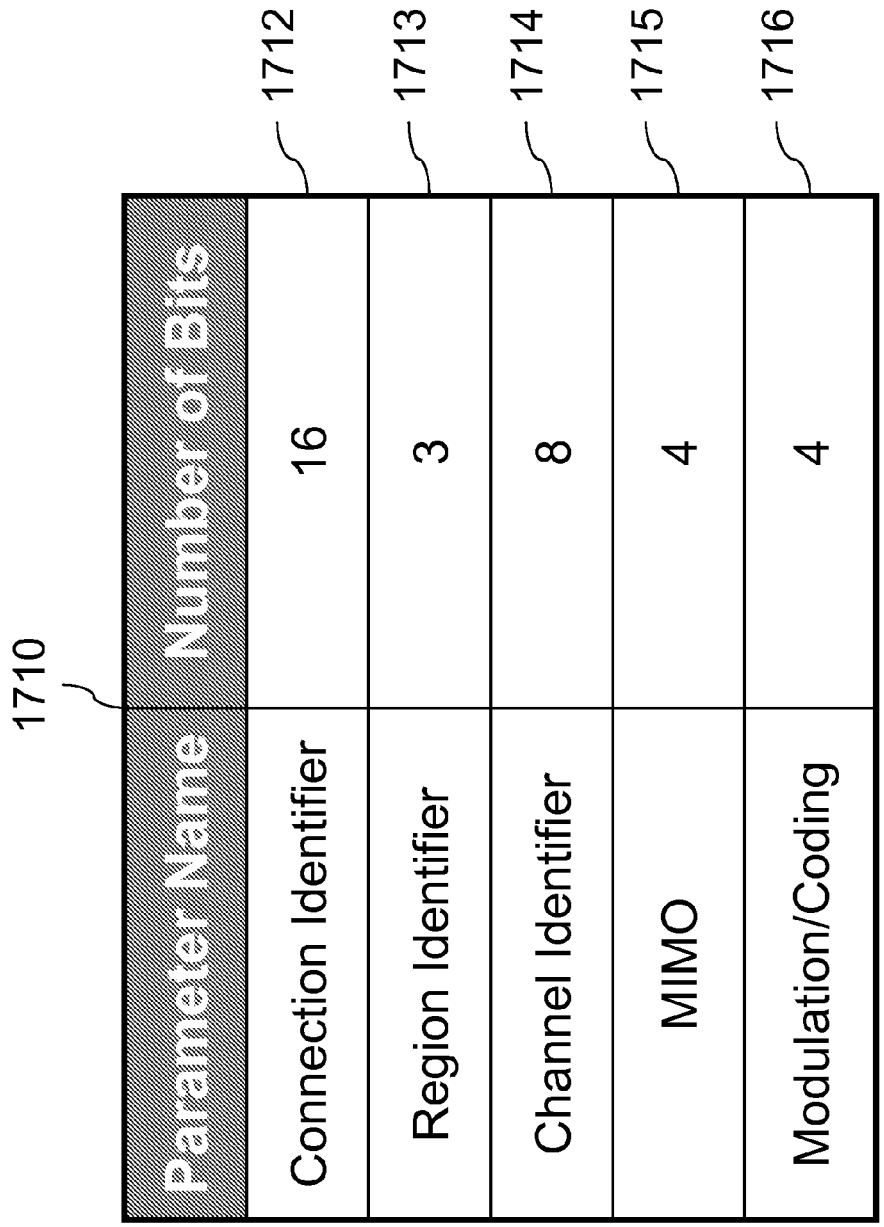
FIG. 17 is an exemplary assignment message.

FIG. 17 provides fields of an illustrative assignment message 1710. Referring to FIG. 17, the assignment message 1710 preferably contains a 16 bit field indicating the connection identifier 1712 of the mobile station, wherein the connection identifier 1712 corresponds to one or more mobile stations. Note that, in some embodiments, the connection identifier is not included in the assignment message 1710, but is rather used to scramble the assignment message 1710. In this way, only the intended mobile station can correctly decode the assignment message 1710. The assignment message 1710 also contains a 3 bit region identifier field 1713 and an 8 bit channel identifier field 1714, wherein the region identifier corresponds to a region and the channel identifier corresponds to one of the nodes from the channel tree. For the case when the channel tree spans multiple regions, it is not necessary to include the region identifier field 1713. Next, the assignment message contains a multiple input multiple output (MIMO) field 1715 for indicating parameters related to the MIMO scheme. The MIMO field 1715 is used to indicate the type of MIMO used by the base station, precoding scheme, antenna configuration, etc. Finally, the assignment message 1710 contains a 4 bit field indicating the modulation and coding 1716 of the packet. It should now be clear to those skilled in the art that there are a variety of ways of communicating the parameters delineated in FIG. 17. What is important is that one or more of these parameters are communicated to the mobile station. Not all parameters are used in all embodiments, and some parameters can be omitted based on the value of other parameters.

Figure 18:
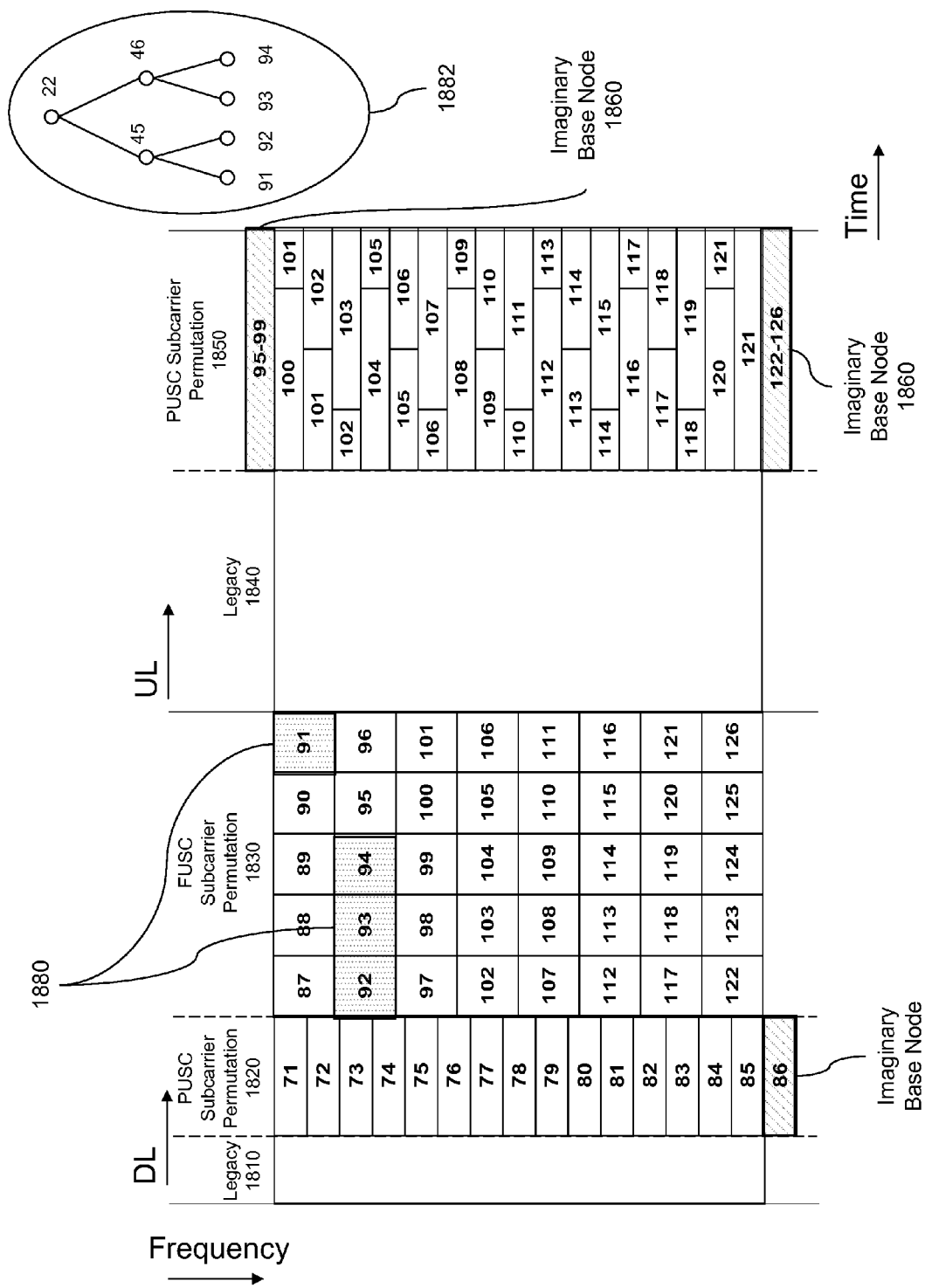
FIG. 18 is an exemplary resource assignment.

FIG. 18 is an example DL resource assignment. Consider that the base station has established the regions of FIG. 15 with base nodes numbered as in FIG. 15 by transmitting the necessary region boundaries to a mobile station. The base station then assigns the mobile station to a particular channel identifier from the channel tree. Referring to FIG. 18, consider that the base station transmits an assignment message to a mobile station containing channel identifier 22. The mobile station receives this assignment message and determines that channel identifier 22 corresponds to base nodes 91, 92, 93, and 94 (see 1882). Based on the known numbering scheme, base node size, and the known region boundaries, the mobile station determines that the subcarrier permutation for base nodes 91-94 is DL FUSC. Based on a known mapping of FUSC subchannels to physical time-frequency resources, the mobile station then determines the physical time-frequency resources which correspond to base nodes 91-94. Since the assignment is on the DL, the mobile station then receives the packet on the physical time-frequency resources.

In some embodiments, the base station persistently allocates resources to a mobile station. For example, the base station can persistently assign a mobile station channel identifier 22 as in FIG. 18. The mobile station continues to receive packets using channel identifier 22 until a known event occurs, for example, a timer elapses. If the base station moves a region boundary, then one of the following rules applies to existing persistent assignments. First, existing persistent assignments are expired. Second, the persistently assigned channel identifier does not change. In this case, the mobile station maintains the same channel identifier. Note that the physical time-frequency resources can change even if the channel identifier remains the same. Third, a shifted channel identifier is derived as follows:
  a. The mobile station determines the collection of base nodes which correspond to the persistently assigned channel identifier.
  b. The mobile station adds (or subtracts) to each base node index a constant to determine a shifted base node index. The constant is determined by multiplying the number of base nodes per OFDM symbol by the number of OFDM symbols by which the region was shifted. For example, if there are 8 base nodes for every three OFDM symbols as in FIG. 6 and the region was shifted to the right by 6 OFDM symbols, then the mobile station would add 16 (8/3*6=16) to each base node index to determined a set of shifted base node indices.
  c. The mobile station determines the shifted channel identifier as the channel identifier that corresponds to the set of shifted base node indices.

Figure 19:
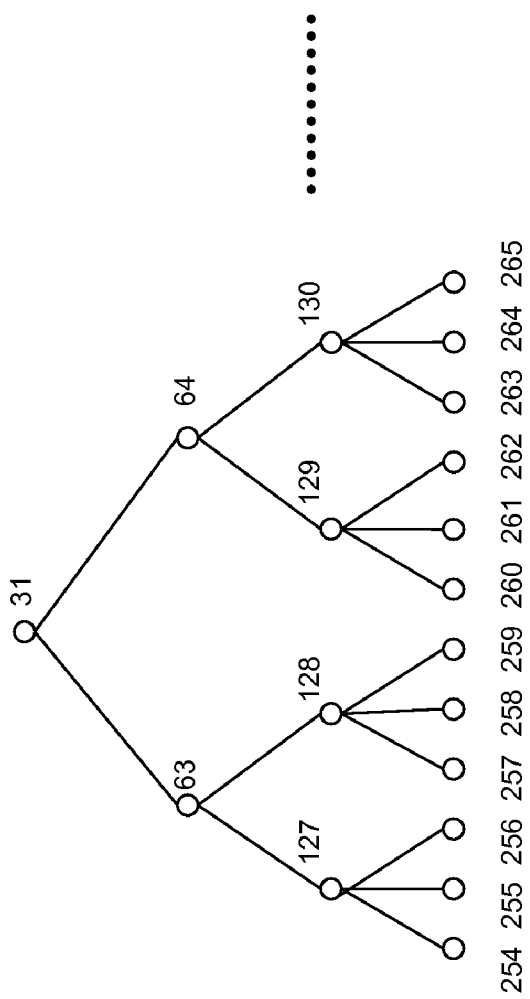
FIG. 19 is an exemplary channel tree, wherein three base nodes comprise a parent node.

FIG. 19 is an example channel tree, wherein three base nodes comprise a parent node. In some embodiments, it is necessary to allow a smaller resource allocation than what is shown FIGS. 9, 11, 14, 15, and 18. A typical channel tree divides resources into two portions with each level of the channel tree as shown in FIGS. 4-5. However, if one of the desired resource sizes is 3 or 9 OFDM symbols as previously described, such a resource can not be divided into two equal pieces. Therefore, a new channel tree structure is provided in FIG. 19, wherein three base nodes form the next parent node. Referring to FIG. 19, base nodes 254, 255, and 256 can be equivalently represented by parent node 127. After this initial 3:1 node relationship, the channel tree resumes its normal 2:1 node relationship. In particular, nodes 127 and 128 can be equivalently represented by node 63. Such a channel tree could be applied to each of FIGS. 9, 11, 14, 15, and 18 by simply dividing each node depicted into three equal pieces, with the numbering as shown in FIG. 19. In general, a channel tree can be represented as a vector where each element in the vector represents the number of lower level nodes that form the current level of the channel tree. For the channel tree of FIG. 4, the vector $\{2, 2, 2, 2, 2, 2, 2\}$ represents the channel tree. For the channel tree of FIG. 19, the vector $\{2, 2, 2, 2, 2, 2, 2, 3\}$ represents the channel tree. Any channel tree vector can be used as long as it is known at the base station and mobile station. The vector representation can also be extended to a matrix such that a different number of channel tree nodes can be combined to form a higher layer node for different channel tree nodes at the same level.

Figure 20:
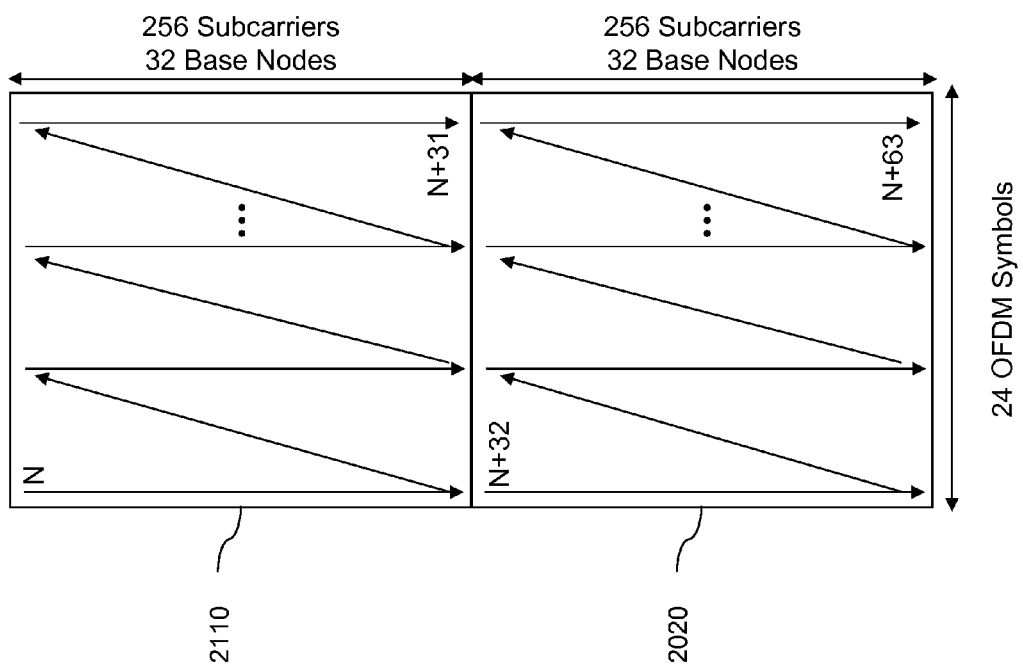
FIG. 20 illustrates the division of the frequency domain into two regions.

FIGS. 7-15 illustrated the division of the time domain into multiple regions. The same principles of FIGS. 7-15 also apply to divisions of the frequency domain, as illustrated in FIG. 20, which shows division of the frequency domain into two regions. Referring to FIG. 20, a time domain region of 24 OFDM symbols is divided into two frequency domain regions 2010 and 2020. In this example, each frequency domain region is comprised of 256 subcarriers and is divided into 32 base nodes. In the example of FIG. 20, the base node numbering is continuous first within the first region 2010 and second continuous across regions. Any combination of time domain regions and frequency domain regions can be used. If a channel tree is defined which spans multiple regions, the base node numbering can be continuous only across time domain region boundaries, can be continuous only across frequency domain region boundaries, or can be continuous across time domain and frequency domain region boundaries. If a unique channel tree is defined in each region, the base node numbering is independent in each region.

Figure 21:
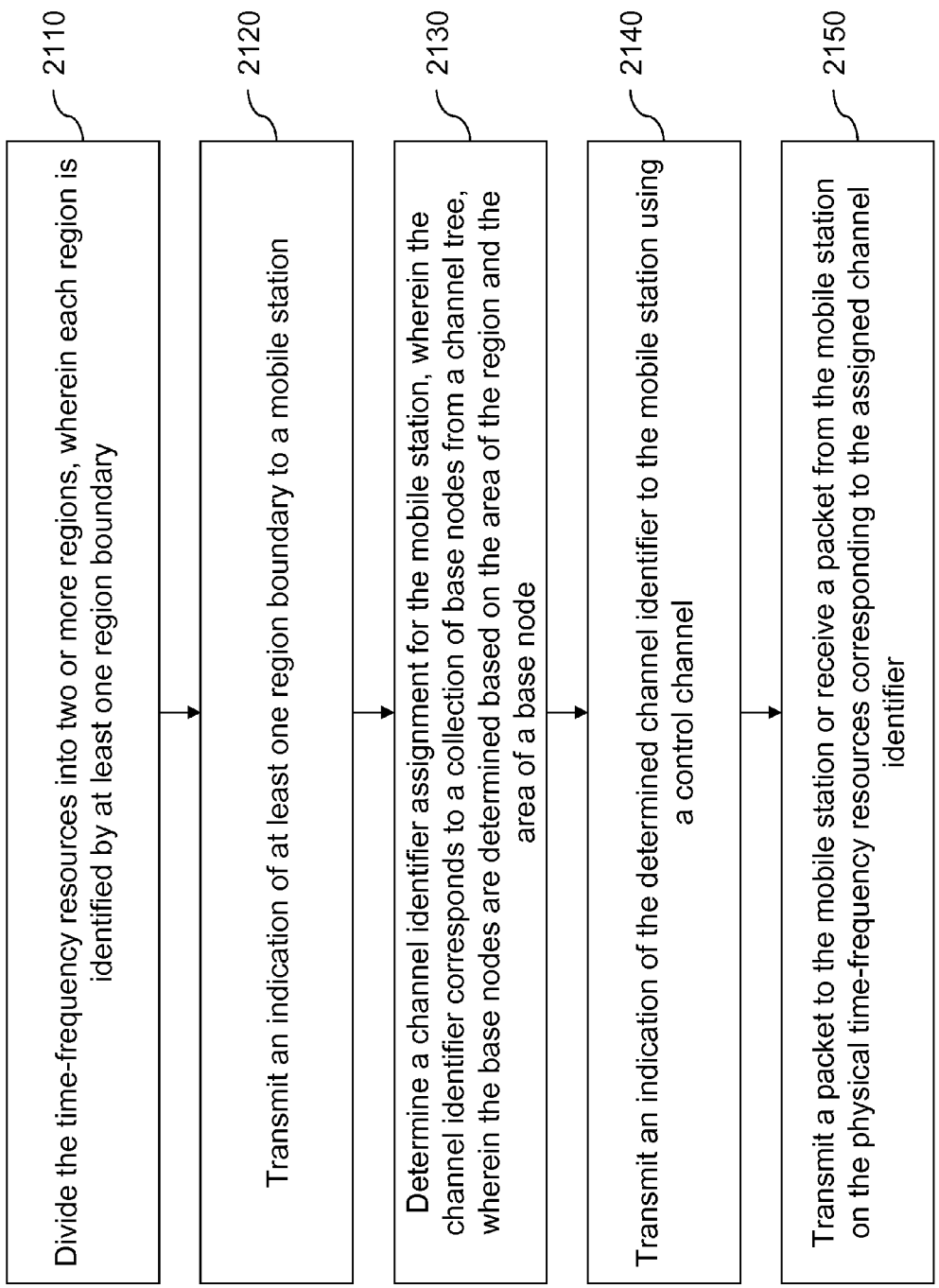
FIG. 21 is a flow chart for exemplary base station operation.
Figure 22:
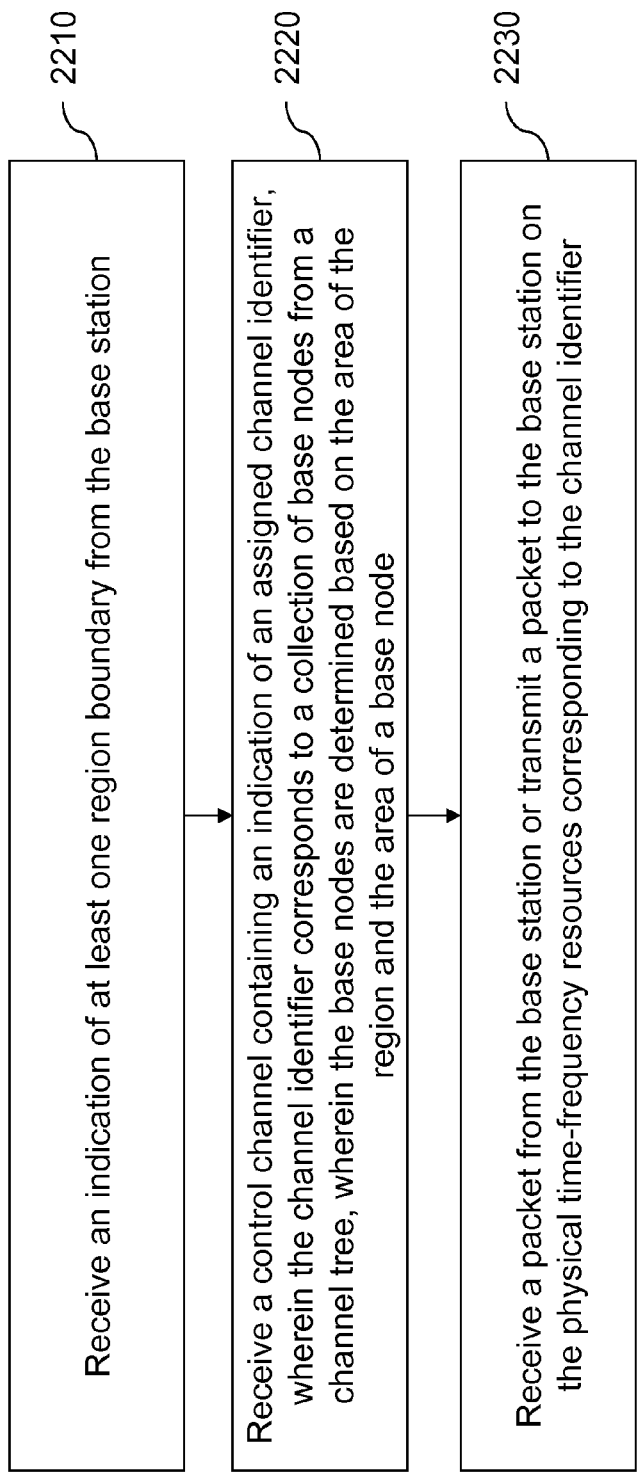
FIG. 22 is a flow chart for exemplary mobile station operation.

FIG. 21 is a flow chart for base station operation. At step 2110, the base station divides the time-frequency resources into two or more regions, wherein each region is identified by at least one region boundary. The region boundaries can be an OFDM symbol number, an offset from another region, and the like. At step 2120, the base station transmits an indication of at least one region boundary to a mobile station. The indication can be sent on a control channel. Note that some region boundaries can be known at the mobile station or derived at the mobile station based on a parameter received from the base station. At step 2130, the base station determines a channel identifier assignment for the mobile station, wherein the channel identifier corresponds to a collection of base nodes from a channel tree, wherein the base nodes of the channel tree are determined based on the area of the region and the area of a base node. The assignment is typically determined by the base station scheduler. At step 2140, the base station transmits an indication of the determined channel identifier to the mobile station using a control channel. At step 2150, the base station transmits a packet to the mobile station or receives a packet from the mobile station on the physical time-frequency resources corresponding to the assigned channel identifier FIG. 22 is a flow chart for mobile station operation. At step 2210, the mobile station receives an indication of at least one region boundary from the base station. At step 2220, the mobile station receives a control channel containing an indication of an assigned channel identifier, wherein the channel identifier corresponds to a collection of base nodes from a channel tree, wherein the base nodes are determined based on the area of the region and the area of a base node. Based on the channel identifier, the mobile station determines the collection of base nodes. Based on the region in which the base nodes are located, the mobile station determines the size of the base node. The mobile station then determines the physical time-frequency resources that correspond to the channel identifier. At step 2230, the mobile station receives a packet from the base station or transmits a packet to the base station on the physical time-frequency resources corresponding to the channel identifier.

One skilled in the art will recognize that the terms base station, mobile station, and the like are intentionally general terms and are not to be interpreted as limited to a particular system, protocol, communications standard, or the like. Those skilled in the art will also recognize that the various methods and steps described herein can be accomplished by a radio device, such as a base station including either a general purpose or a special purpose processor appropriately programmed to accomplish, e.g., the presently described methods and steps. The base station preferably includes storage medium for storing programming instructions for the processor.

One skilled in the art will recognize that the terms base station, mobile station, and the like are intentionally general terms and are not to be interpreted as limited to a particular system, protocol, communications standard, or the like. Those skilled in the art will also recognize that the various methods and steps described herein can be accomplished by a radio device, such as a base station including either a general purpose or a special purpose processor appropriately programmed to accomplish, e.g., the presently described methods and steps. The base station preferably includes storage medium for storing programming instructions for the processor.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method of assigning a radio resource in a wireless communication system, the method comprising:
   transmitting at least one region boundary to a mobile station, the at least one region boundary indicating a division of time-frequency resources into at least two regions;
   determining an area of a first region of the at least two regions, the area of the first region being a multiple of a number of OFDM symbols in the first region and a number of OFDM sub-channels in the first region;
   determining a number of nominal base nodes of pre-defined area that will fill the area of the first region;
   determining a number of imaginary base nodes, the number of imaginary base nodes being a difference between the number of nominal base nodes and a next highest power of a pre-selected integer;
   determining an area of a non-nominal base node when the area of the first region divided by the pre-defined area is not an integer;
   logically apportioning the time-frequency resources of the first region into the number of nominal base nodes, the number of imaginary base nodes, and the non-nominal base node;
   determining a channel identifier assignment for the mobile station, the channel identifier corresponding to a collection of base nodes from a channel tree, the channel tree having base nodes that are determined based on the nominal base nodes, the imaginary base nodes and the non-nominal base node; and
   transmitting an indication of the determined channel identifier to the mobile station.

2. The method of claim 1 further comprising transmitting a packet to the mobile station using physical time-frequency resources corresponding to the determined channel identifier.

3. The method of claim 1 further comprising receiving a packet from the mobile station using physical time-frequency resources corresponding to the determined channel identifier.

4. The method of claim 1, wherein the imaginary base nodes do not correspond to any physical time-frequency resources.

5. The method of claim 1, wherein at least one of the base nodes corresponds to a different amount of time-frequency resources than a nominal base node corresponds to.

6. The method of claim 1, wherein the collection of base nodes corresponding to a channel identifier is determined as the largest number of base nodes within one region that cannot be equivalently represented by a lower channel tree node.

7. The method of claim 1 wherein the wireless communication system is an orthogonal frequency division multiplexing based (OFDMA-based) system.

8. A method of receiving a radio resource assignment in a wireless communication system, the method comprising:
   receiving at least one region boundary from a base station, the at least one region boundary indicating a division of the time-frequency resources into at least two regions;
   receiving an indication of a channel identifier from the base station, the channel identifier corresponding to a collection of base nodes from a channel tree, the channel tree having base nodes based on a number of nominal base nodes, a number of imaginary base nodes, and a non-nominal base node;
   wherein an area of the first region of the at least two regions is a multiple of a number of OFDM symbols in the first region and a number of OFDM sub-channels in the first region;
   wherein the nominal base nodes have pre-defined areas, and wherein the number of nominal base nodes is a number of the pre-defined areas that will fill the area of the first region;
   wherein the number of imaginary base nodes is a difference between the number of nominal base nodes and a next highest power of a pre-selected integer;
   wherein the non-nominal base node area is the area of the first region divided by the pre-defined area is not an integer; and
   wherein the time-frequency resources of the first region are logically apportioned into the number of nominal base nodes, the number of imaginary base nodes, and the non-nominal base node.

9. The method of claim 8, further comprising transmitting a packet to the base station using the physical time-frequency resources corresponding to the indicated channel identifier.

10. The method of claim 8, further comprising receiving a packet from the base station using the physical time-frequency resources corresponding to the indicated channel identifier.

11. The method of claim 8 wherein the wireless communication system is an orthogonal frequency division multiplexing based (OFDMA-based) system.

12. A method of dynamically assigning time-frequency resources for a pre-defined region of available time-frequency resources, comprising:
   (a) determining an area of the pre-defined region, the area being a multiple of a number of OFDM symbols in the pre-defined region and a number of OFDM sub-channels in the pre-defined region;

(b) determining a number of nominal base nodes of pre-defined area that will fill the area of the pre-defined region;

(c) determining a number of imaginary base nodes, the number of imaginary base nodes being the difference between the number of nominal base nodes determined in step (b) and the next highest power of a pre-selected integer;

(d) determining an area of a non-nominal base node when the area of the pre-defined region divided by the area of a nominal base node is not an integer;

(e) logically apportioning the time-frequency resources of the pre-defined region into the nominal base nodes determined in step (b), the imaginary base nodes determined in step (c), and the non-nominal base node determined in step (d); and (f) transmitting, from a base station to a mobile station, a channel identifier corresponding to a collection of base nodes selected from one or more of the nominal base nodes, the imaginary base nodes and the non-nominal base node.

13. The method of claim 12 wherein the pre-selected integer is 2.

14. The method of claim 12 wherein the area of the non-nominal base node is zero when the area of the pre-defined region divided by the area of a nominal base node is an integer.

15. The method of claim 12 wherein steps (a) through (e) are repeated for multiple pre-defined regions.

16. A base station comprising:

a processor;

a computer readable medium storing programming for execution by the processor, the programming including instructions to:

(a) transmit at least one region boundary to a mobile station, the at least one region boundary indicating a division of time-frequency resources into at least two regions;

(b) determine an area of a first region of the at least two regions, the area of the first region being a multiple of a number of OFDM symbols in the first region and a number of OFDM sub-channels in the first region;

(c) determine a number of nominal base nodes of pre-defined area that will fill the area of the first region;

(d) determine a number of imaginary base nodes, the number of imaginary base nodes being a difference between the number of nominal base nodes determined in step (c) and a next highest power of a pre-selected integer;

(e) determine an area of a non-nominal base node when the area of the first region divided by the pre-defined area is not an integer;

(f) logically apportion the time-frequency resources of the first region into the nominal base nodes determined in step (c), the imaginary base nodes determined in step (d), and the non-nominal base node determined in step (e);

(g) determine a channel identifier assignment for the mobile station, the channel identifier corresponding to a collection of base nodes from a channel tree, the channel tree having base nodes that are determined based on the area of the first region and the pre-determined area; and (h) transmit an indication of the determined channel identifier to the mobile station.

17. The base station of claim 16 wherein the processor is a collection of a plurality of processors working in concert.

18. The base station of claim 16, the programming including instructions to transmit a packet to the mobile station using physical time-frequency resources corresponding to the determined channel identifier.

* * * * *